(12) United States Patent (10) Patent No.: US 12,393,040 B2
Heshmat Dehkordi et al. (45) Date of Patent: Aug. 19, 2025

(54) SYSTEM AND METHOD FOR GENERATING COMPACT LIGHT-FIELD DISPLAYS THROUGH VARYING OPTICAL DEPTHS

(71) Applicant: Brelyon Inc, San Mateo, CA (US)

(72) Inventors: Barmak Heshmat Dehkordi, San Mateo, CA (US); Christopher Barsi, Lee, NH (US)

(73) Assignee: Brelyon Inc, San Mateo, CA (US)

( * ) Notice: Subject to any disclaimer, the term of this patent is extended or adjusted under 35 U.S.C. 154(b) by 454 days.

(21) Appl. No.: 18/066,844

(22) Filed: Dec. 15, 2022

(65) Prior Publication Data

US 2023/0124178 A1   Apr. 20, 2023

Related U.S. Application Data

(63) Continuation-in-part of application No. 16/684,586, filed on Nov. 14, 2019, now Pat. No. 11,592,684.

(Continued)

(51) Int. Cl.
    *G02B 27/01* (2006.01)
    *G02B 27/02* (2006.01)
    *G02B 27/14* (2006.01)

(52) U.S. Cl.
    CPC ....... *G02B 27/026* (2013.01); *G02B 27/0101* (2013.01); *G02B 27/141* (2013.01); *G02B 2027/0127* (2013.01)

(58) Field of Classification Search
    CPC .............. G02B 27/026; G02B 27/0101; G02B 27/141; G02B 2027/0127; G02B 30/52; G02B 30/56; G02B 30/60; G02B 2027/0134; G02B 2027/0185; G02B 30/40; G02B 2027/0138; G02B 2027/015; G03B 21/28; B60K 35/211; B60K 35/23;
    (Continued)

(56) References Cited

U.S. PATENT DOCUMENTS 9,864,205 B2   1/2018  Bedard et al.
10,514,483 B2  12/2019 Heshmat Dehkordi et al.
(Continued)

OTHER PUBLICATIONS

Dieter Schmalstieg and Tobias Höllerer, Augmented Reality: Principles and Practice, Addison-Wesley Professional (2016).

(Continued)

*Primary Examiner* — Ryan S Dunning

(57) ABSTRACT

A system and method for generating compact light-field displays through varying optical depths provides digital content in a more effective and efficient manner. The system includes a field-evolving cavity with a cavity exit pupil, a relay mechanism, and a system enclosure with an enclosure exit pupil. The field-evolving cavity modifies the light-field displays before outputting the light-field displays with the cavity exit pupil. More specifically, the field-evolving cavity includes at least one display panel, which initially generates the light-field displays, and at least one optical-tuning mechanism, which subsequently modifies the light-field displays to varying optical depths. The system enclosure houses the field-evolving cavity and the relay mechanism. The relay mechanism directs the light-field displays from the cavity exit pupil to the enclosure exit pupil, which outputs the light-field displays to a user.

27 Claims, 20 Drawing Sheets
(15 of 20 Drawing Sheet(s) Filed in Color)

Related U.S. Application Data

(60) Provisional application No. 62/806,968, filed on Feb. 18, 2019, provisional application No. 62/767,029, filed on Nov. 14, 2018.

(58) Field of Classification Search
CPC ............ B60K 35/232; B60K 2360/177; H04N 13/346; H04N 13/395
See application file for complete search history.

(56) References Cited

U.S. PATENT DOCUMENTS

| | | | |
|---|---|---|---|
| 10,684,464 B2* | 6/2020 | Aschwanden | ..... G02B 26/0816 |
| 2018/0341171 A1 | 11/2018 | Choi | |

OTHER PUBLICATIONS

Rolf R. Hainich, Oliver Bimber, Displays: Fundamentals & Applications, CRC Press (2017).

B. Heshmat, "Fundamental limitations for augmented reality displays with visors, waveguides or other passive optics," COSI conference, FL, USA, 3M5G. 1, (2018).

J. M. Fulvio, & B. Rokers, "Use of cues in virtual reality depends on visual feedback," Sci. Rep. 7, 16009, (2017).

Granrud, C. E., Yonas, A. & Pettersen, L. "A comparison of monocular and binocular depth perception in 5- and 7-month-old infants," J. Exp. Child Psychol. 38, 19-32 (1984).

R. Patterson, "Human factors of 3-D displays," J. Soc. Inf. Disp., 11, 861-871 (2012).

K. Ukai, & P. A. Howarth, "Visual fatigue caused by viewing stereoscopic motion images: Background, theories, and observations," Displays, 29, 106-116 (2008).

D. M. Hoffman, A. R. Girshick, K. Akeley, & M. S. Banks, "Vergence-accommodation conflicts hinder visual performance and cause visual fatigue," J. Vis. 28, 1-30 (2008).

C. Vienne, L. Sorin, L. Blondé, Q. Huynh-Thu, & P. Mamassian, "Effect of the accommodation-vergence conflict on vergence eye movements," Vision Res. 100, 124-33 (2014).

I. Bülthoff, H. Bülthoff, & P. Sinha, "Top-down influences on stereoscopic depth-perception," Nat. Neurosci. 3, 254-257, (1998).

Y. Tsushima, K. Komine, Y. Sawahata, & N. Hiruma, "Higher resolution stimulus facilitates depth perception: MT1 plays a significant role in monocular depth perception," Sci. Rep., 4, 6687 (2014).

B. Heshmat, M. Tancik, G. Satat & R. Raskar, "Photography optics in the time dimension," Nature Photonics, 12, 560-566 (2018).

D. Fattal, Z. Peng, T. Tran, S. Vo, M. Fiorentino, J. Brug & R. G. Beausoleil, "A multi-directional backlight for a wide-angle, glasses-free 3D display" Nature 495, 348-351 (2013).

H. Huang and H. Hua, "Systematic characterization and optimization of 3D light field displays," Opt. Express 25, 18508-18525 (2017).

K. J. Mackenzie, D. M. Hoffman & S. J. Watt, "Accommodation to multiple-focal-plane displays: Implications for improving stereoscopic displays and for accommodation control," J. Vis., 10, 22 (2010).

Ernst Lueder, 3D Displays, John Wiley & Sons, (2012).

G. Wetzstein, D. Lanman, W. Heidrich, R. Raskar, "Layered 3D: tomographic image synthesis for attenuation-pased light field and high dynamic range displays," ACM Transactions on Graphics (ToG) 30, 95 (2011).

G. Wetzstein, M. Hirsch, W. Heidrich, R. Raskar, D. Lanman, "Polarization fields: dynamic light field display using multi-layer LCDs," ACM Transactions on Graphics (TOG), 30, 186 (2011).

N. Matsuda, A. Fix, D. Lanman, "Focal surface displays," ACM Transactions on Graphics (TOG), 36, 86 (2017).

S. Tay, P. A. Blanche, R. Voorakaranam, A. V. Tunç, W. Lin, S. Rokutanda, T. Gu, D. Flores, P. Wang, G. Li, P. St Hilaire, J. Thomas, R. A. Norwood, M. Yamamoto & N. Peyghambarian, "An updatable holographic three-dimensional display," Nature 451, 694-698 (2008).

F. Yaraş, H. Kang, and L. Onural, "State of the Art in Holographic Displays: A Survey," J. Display Technol. 6, 443-454 (2010).

Y. Takaki and N. Nago, "Multi-projection of lenticular displays to construct a 256-view super multi-view display," Opt. Express 18, 8824-8835 (2010).

D. Teng, Z. Pang, Y. Zhang, D. Wu, J. Wang, L. Liu, and B. Wang, "Improved spatiotemporal-multiplexing super-multiview display based on planar aligned OLED microdisplays," Opt. Express 23, 21549-21564 (2015).

N. Bedard, P. Llull, I. Tosic, W. Wu, K. Berkner, "Multifocal Display," U.S. Pat. No. 9,864,205B2, (2018).

B. Heshmat, M. Tancik "Time-folded imaging; Methods and Apparatus for Imaging Using Optical Cavity," U.S. Appl. No. 15/682,145, (2017).

* cited by examiner

SYSTEM AND METHOD FOR GENERATING COMPACT LIGHT-FIELD DISPLAYS THROUGH VARYING OPTICAL DEPTHS

This is a continuation-in-part of U.S. patent application Ser. No. 16/684,586, filed on Nov. 14, 2019, and titled, "System and Method for Generating Compact Light-Field Displays through Varying Optical Depths," which is incorporated by reference herein.

FIELD OF THE INVENTION

The present invention relates generally to light-field displays. More specifically, the present invention is a system for creating compact light-field displays through varying optical depths.

BACKGROUND OF THE INVENTION

In present society, there has been an increasing traction towards more immersive light-field and/or autostereoscopic three-dimensional (3D) displays due to advancements in electronics and micro fabrications. Unlike stereoscopic 3D, light-field displays manipulate the wavefront to create depth perception at the monocular level. This can eliminate the accommodation-vergence mismatch and reduce stress on the user's eyes. There have been breakthroughs for realizing more realistic light-field experiences, which can be described in four major methods for creating such experiences, each method each having its own weaknesses and advantages: super multi-view, computational, multi-focal, and holographic. The super multi-view method provides a light-field at a very compact form but is limited to a very small viewing zone and low resolution. The computational method increases the resolution but produces haze and temporal flickering artifacts. The holographic method can struggle with color nonuniformity and fringing or specular artifacts. The multi-focal method can produce clean, but not scalable, images. Also, devices employing a multi-focal method can be bulky. However, universal to all current methods of light field displays are these following issues: large bandwidth requirements; a reliance on expensive and/or advanced components that are not easily mass produced such as tunable lenses; poor color uniformity, small field of view or viewing zone, low brightness, haze and diffraction artifacts, limited depth range; and the occasional necessity to wear specialized glasses. These challenges have significantly limited the use or production of light-field displays in commercial and/or industrial settings. Therefore, what is needed is a thorough class of optical methods that in some embodiments uses a set of reflectors positioned in a cavity to multiplex different liquid crystal displays (LCDs) or different portions of a single LCD onto different optical focal planes. This can allow a light-field within the cavity to adapt into or to certain optical depth(s) before it exits the cavity's exit pupil, while resolving the previously discussed issues associated with other methods of light-field display.

An objective of the present invention is to provide users with a device that can be a compact system of creating light-field displays at or through varying optical depths. The present invention intends to provide users with a device that address the previously discussed issues associated with current methods of light field displays. The present invention intends to provide users with a device that is less expensive and easier to produce at or for commercial and/or industrial levels. The present invention intends to provide users with a device that reduces artifacts without reducing the clarity of the light-field display. The present invention intends to provide users with a device that allows users to produce content for light-field displays more easily than conventional stereoscopic displays. The present invention intends to provide users with a device that does not require additional accessories or specialized components to be utilized by the user in order to view the content of the light-field display, such as specialized glasses or rending engines, respectively. The present invention intends to provide users with a device that can reduce an optical path difference to each focal plane of the light-field display and minimize the light loss from polarization. The present invention intends to provide users with a device that can vary the display focal plane without any mechanical motion.

SUMMARY OF THE INVENTION

The present invention is a system for creating compact light-field displays through varying optical depths. The present invention primarily contains a housing. The housing contains a plurality of panels in a variety of arrangements in which the present invention can produce light-field displays of varying degrees or scope. The present invention also contains a relay panel. The present invention contains a cover case atop the housing.

Realizing accurate light-field displays usually requires advanced optical structures that use high-cost light sources and spatial modulators such as laser scanners, tunable lenses; liquid crystal on silicon (LCoS) reflectors or digital micro-mirror devices (DMDs). Accordingly, these existing methods do not provide true optical depth which means that there is inaccuracy in the wavefront in the form of diffraction color inaccuracy, speckle, or haze. A class of displays systems and methods revolves around the concept of field-evolving (FE) cavities. These cavities prepare the light in such a way that it provides true optical depth with no distortion to the wavefront, and, therefore, the images provided by such systems are as accurate as a normal display panel. This method uses conventional LCD or organic light-emitting diode (OLED) panel displays in a fashion that provides multiple optical focal planes simultaneously or sequentially in opaque or augmented (transparent) modality. The system can also be conveniently packaged in a small form factor well suited to desktop uses. Since the cavity feeds regular two-dimensional (2D) images and combines them optically into a 3D light-field, there is no need for complex rendering engines. The methods are also scalable to large-scale displays for commercial uses.

BRIEF DESCRIPTION OF THE DRAWINGS

The patent of application file contains at least one drawing executed in color. Copies of this patent or patent application publication with color drawing(s) will be provided by the office upon request and payment of the necessary fee.

The following description illustrates aspects of embodiments of the disclosed apparatuses, methods, and systems in more detail, by way of examples, which are intended to be non-limiting and illustrative with reference to the accompanying drawings, in which.

DETAILED DESCRIPTION OF THE INVENTION

Figure 1:
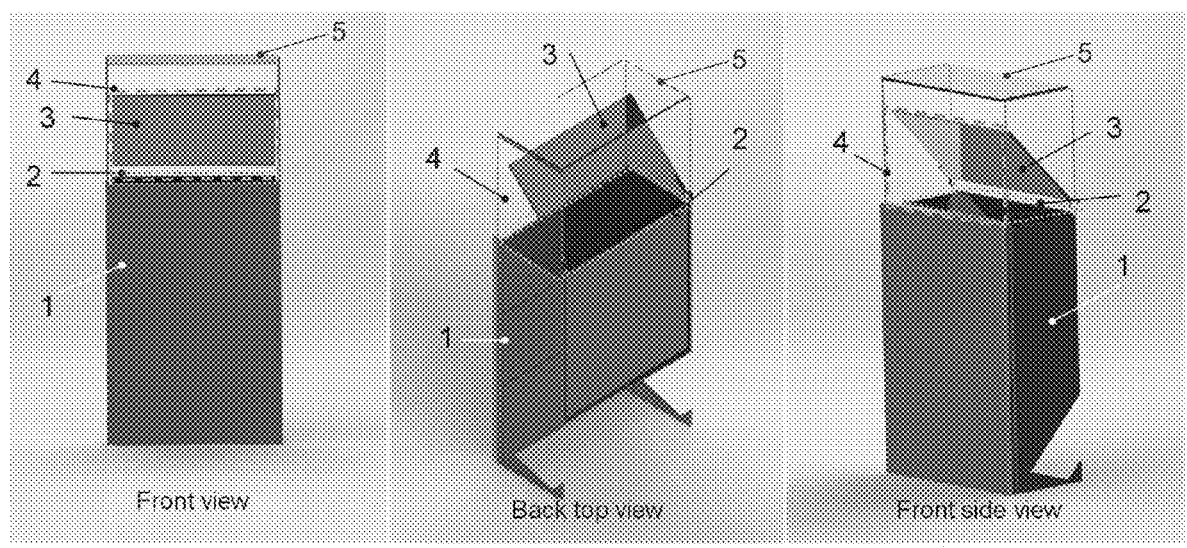
FIG. 1 illustrates a light-field display based on a three-layer field-evolving cavity, wherein a non-limiting example of the 3D model of a three-layer light-field display prototype is shown, wherein a front view is shown on the left, a back top view is shown in the middle, and a front side view is shown on the right.

All illustrations of the drawings are for the purpose of describing selected versions of the present invention and are not intended to limit the scope of the present invention.

In conventional binocular or stereographic vision, the display system provides two offset images separately to the left and right eye of the viewer. These two-dimensional images along with accommodation of the eye lenses are then combined in the brain of the viewer to give the perception of 3D depth in front of the viewer. If the true optical depth (curvature of the wavefront) does not match the parallax provided by the stereoscopic images, then the viewer experiences a bit of uncomfortable inaccuracy, since his/her eye lenses are telling the brain that the image is at a certain distance and that the parallax is telling the brain otherwise. This is known as accommodation-vergence mismatch. Light-field display systems change the wavefront in such a way as to provide both parallax and accommodation cues. Conventional methods of providing light-field displays has been limited by cost, accuracy of the image, bandwidth, the need for wearing headsets or glasses, bulkiness, and manufacturability.

To overcome this tradeoff between perceived content realism and manufacturability, the present invention uses a field-evolving cavity built around conventional LCD or OLED panel displays to produce digital content at one or more display focal depths which are then relayed to the outside world. This approach does not require tunable lenses, extensive computational rendering engines; it also does not necessarily rely on freeform optics, can be cost-efficiently manufactured, and provides the light-field experience for any number of users within the large viewing zone.

General Purpose

The present invention provides a multi-layer light-field experience in a mass producible way with image accuracy comparable to high-quality displays. The purpose of the present invention is the realization of a compact and practical transparent or opaque light-field display, which does not suffer from accommodation-vergence conflict and does provide true optical depth. Such a display has wide-ranging utility in a variety of contexts, further elaborated upon hereinafter. The light-field can be used as an entertainment display, for commercial applications, or industrial use cases such as in navigation or biomedical use cases. In near-head use cases, the present invention provides virtual depth or optical space which seems like a virtual window and can provide a sense of scale despite having a small pupil. For example, the present invention can magnify a 13-inch exit pupil sitting 10 inches from the head to appear as a 60-inch monitor sitting 3 meters away from the user.

In the preferred embodiment, the present invention comprises a system enclosure 5, a field-evolving cavity 1, and a relay mechanism 3, which are shown in FIGS. 1 through FIG. 13. The system enclosure 5 is used to house the other components of the present invention. Thus, the field-evolving cavity 1 and the relay mechanism 3 are mounted within the system enclosure 5. The field-evolving cavity 1 is a compact body that is responsible for modifying the light-field displays. Moreover, the field-evolving cavity 1 comprises a cavity exit pupil 2, at least one display panel 6, and at least one optical-tuning mechanism 7. The display panel 6 generates the initial light-field display, which is modified by the optical-tuning mechanism 7, and the modified light-field display is then outputted by the cavity exit pupil 2. In addition, the display panel 6 and the optical-tuning mechanism 7 are configured into a specific optical arrangement, which allows for at least one light-field display 6 to be generated with at least one focal plane along at least one optical path. The optical path specifically traverses from the display panel 6 to the cavity exit pupil 2. The relay mechanism 3 is used to transfer the modified light-field display from the cavity exit pupil 2 to an enclosure exit pupil 4 of the system enclosure 5, and, thus, the cavity exit pupil 2 is in optical communication with the enclosure exit pupil through the relay mechanism 3.

FIG. 1 illustrates the field-evolving cavity 1 for a prototype model of the present invention. The cavity exit pupil 2 is also shown by a dotted line rectangular frame in FIG. 1. The relay mechanism 3 in this case is a simple mirror or switchable mirror and relays the cavity exit pupil 2 to the enclosure exit pupil 4. The enclosure exit pupil 4 also allows the light that exits this pupil to reach the user or users directly with no further manipulation. This enclosure exit pupil 4 is shown with a dashed line rectangular frame in FIG. 1.

Technical Description

Figure 2:
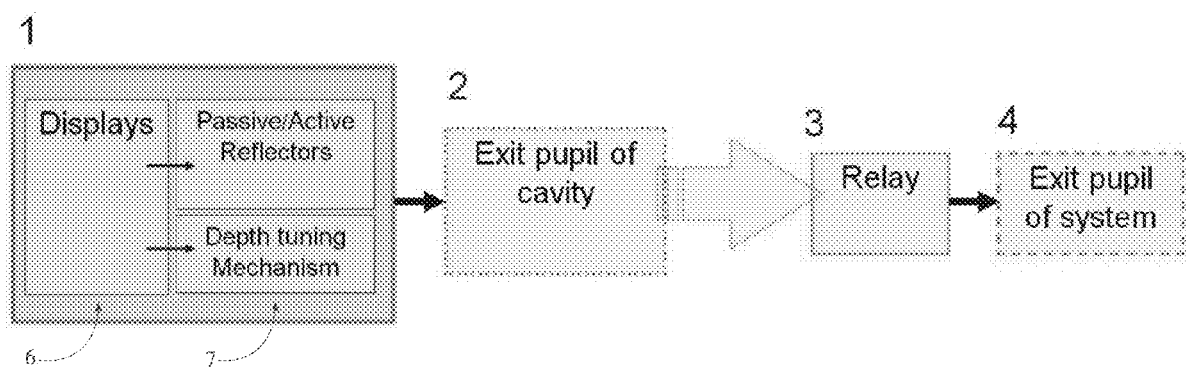
FIG. 2 illustrates a generalized block diagram of the cavity-based light-field systems in this disclosure, wherein a block diagram of a FE cavity-based light-field display system is shown, and wherein the cavity generates light of multiple focal planes and feeds it to a relay mechanism which then projects it to outside world.

Aspects of the disclosed apparatuses, methods, and systems describe various methods, systems, components, and techniques that enable the display of digital content at two or more focal planes and contribute to a significant reduction of the size and cost of the light-field display systems. The disclosed apparatuses, methods, and systems work by generating digital content at multiple depths within a field-evolving cavity 1 and relaying this content to the user's eyes, as illustrated in FIG. 2.

First, digital content is generated within a field-evolving cavity 1, at one or more depths. This may be done in a variety of ways, the details of which are described in the section titled, "Design of the field-evolving cavity." Then, a relay mechanism 3 is used to enable a user to view the digital content in different modalities, the details of which are described in the section titled, "Relay mechanisms and application modalities."

Additionally, the technology described herein may be used not only for larger-scale displays such as desktop monitors, television sets, and heads-up displays but also in a new modality of near-head displays. The details of this application extension are described in the section titled, "Relay mechanisms and application modalities." The thickness of the field-evolving cavity 1 may be reduced with the use of sequential relaying inside and outside of the field-evolving cavity 1, the details of which is explained in the section titled, "Compressed designs." Details of a nonlimiting example of a practical prototype are given in the section entitled, "Prototype model."

This disclosure has four major aspects or focuses: (1) the design of the field-evolving cavity 1 necessary to generate one or multiple focal planes from one or more display panels; (2) the methods of generating different tunable focal planes (i.e., light-fields with tunable planes) by varying or elaborating the cavity arrangement or using switchable mirrors or LCD layers; (3) elaboration on the means of relaying light from the cavity exit pupil 2 to the enclosure exit pupil 4; and (4) elaboration of compressed designs and near-head use cases.

Design of the Field-Evolving Cavity

In order to provide true optical depth for different layers of a light-field, there needs to be an optical mechanism that prepares or manipulates the curvatures of the wavefront of the light which is true to that depth or correct for that depth. The various embodiments of the field-evolving cavity 1, illustrated in FIGS. 3 through 13, are cavities or void spaces comprising at least one display panel 6 (based on Liquid Crystal Displays (LCD), Thin-film Transistor (TFT), Light Emitting Diode (LED), Organic Light Emitting Diode arrays (OLED), Active Matrix Organic Light Emitting Diode (AMOLED), projection on flat screen or any other display technology) and/or at least one mirror 8 and/or at least one half mirror 9 and/or a plurality of switchable mirrors 13 or at least one liquid crystal cell layer 16 arranged and assembled in such a way as to exit bundles of light with divergence apexes at different depths from the cavity exit pupil 2. These apexes can be from different displays at different depths inside the field-evolving cavity 1 or from a single display panel 6 along the entirety of the field-evolving cavity 1. The cavity exit pupil 2 delivers light into a relay mechanism 3, resulting in a different or the same reference apex (depending on the type of relay) of divergence for different focal planes being presented to the user. The relaying mechanism 3 can be a simple flat surface, or a free-form curved surface as further discussed herein, or it can be a geometrical or diffractive waveguide, or any other suitable relay means. The relay mechanism 3 can be semi-transparent, opaque, or tunable in transparency (e.g. a switchable mirror).

Since theoretically, there is an infinite number of these types of field-evolving cavities, determining a class of the field-evolving cavity 1 is based on the dimensionality of display arrangement. If all of the display panels 6 are along a single axis (e.g. the y axis), then the field-evolving cavity 1 is defined as Class I. More specifically, the display panel 6 is positioned along the single axis, and the single axis is positioned either perpendicular or parallel to the cavity exit pupil 2. Alternatively, if all of the display panels 6 are arranged in both x and y dimensions, then the field-evolving cavity 1 is Class II. More specifically, a plurality of display panels 6 is positioned along a pair of axes, and the pair of axes is positioned perpendicular to each other, while each of the pair of axes being positioned either perpendicular or parallel to the cavity exit pupil 2. Furthermore, the order of the cavity exit pupil 2 is the maximum number of times that the light bundle from any pixel of the display panel 6 is reflected before it exits the cavity exit pupil 2. Any field-evolving cavity 1 that has at least one display panel 6 arranged at an angle that is not a multiple of 90 degrees in x and y is still considered as a Class II cavity but are referred to as Class II wedge cavities or angled cavities. More specifically, the display panel 6 is positioned along an alignment axis, and the alignment axis is positioned at an angle to the cavity exit pupil 2.

The following descriptions and drawings in FIGS. 3 through 13 provide non-limiting examples of Class I field-evolving cavities, which can be used to generate digital content at multiple focal depths using a single display panel 6 or multiple display panels 6 in parallel arrangements. In all of these configurations, the display panel 6 can use a variety of display technologies such as OLED, LCD, LED, AMO-LED, or any display technologies or projection screen that provides a 2D image. In non-limiting examples of these conceptions, the display panel 6 can be replaced with an LCoS (Liquid crystal on silicon) spatial light modulator illuminated by a sequential RGB light, or DMD (Digital Mirror Device) spatial light modulator illuminated by a display. Therefore, in this disclosure, a "display panel" refers to any architecture that provides an array of light that can be focused or collimated to create an image.

In all non-limiting examples and configurations given in FIGS. 3 through 9, the reflectors can be polarization-dependent reflectors, semi-transparent reflectors, thin layer pellicle reflectors, beam splitter cubes, or other suitable reflectors. In all these configurations, the light from different portions of display panels 6 or from different panels 6 can be polarized in such a way to increase the output light efficiency of the light-evolving cavity 1. More specific examples are given in the figures throughout this disclosure.

Figure 3A:
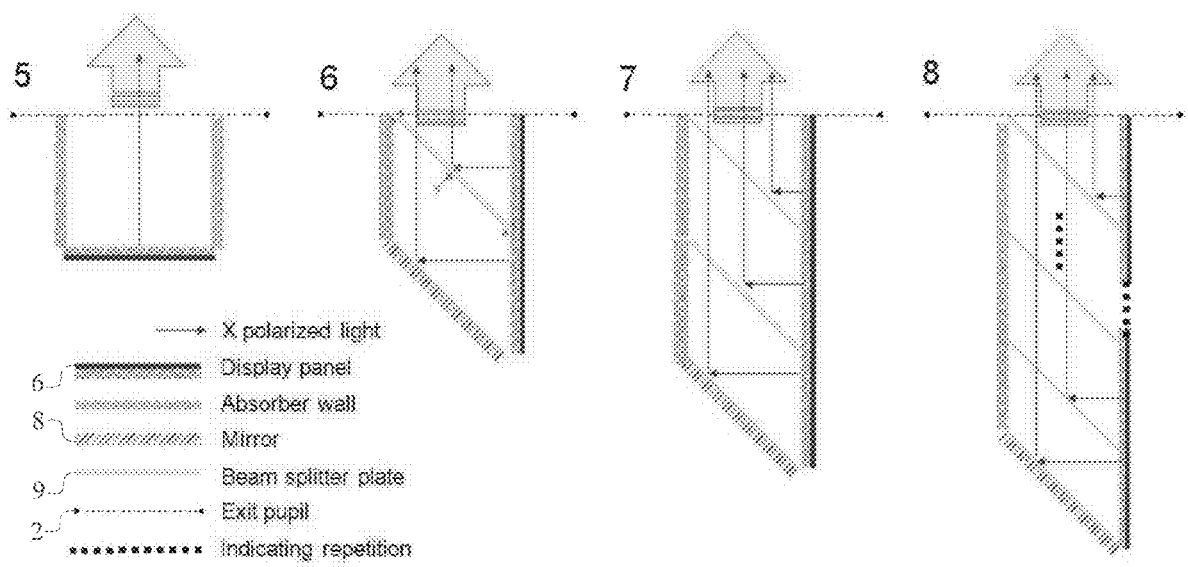
FIGS. 3A, 3B, and 3C illustrate Class I FE cavities examples with first-order exit pupil, in which displays are arranged in one dimension or one axis (either vertical or horizontal), and the light for each layer bounces from each reflector only once, meaning there are no roundtrips or loops that light travels before exiting the cavity, wherein nonlimiting examples of different designs under Class I FE cavities category, ranging from simple to more complex with a greater number of layers, are shown.
Figure 3B:
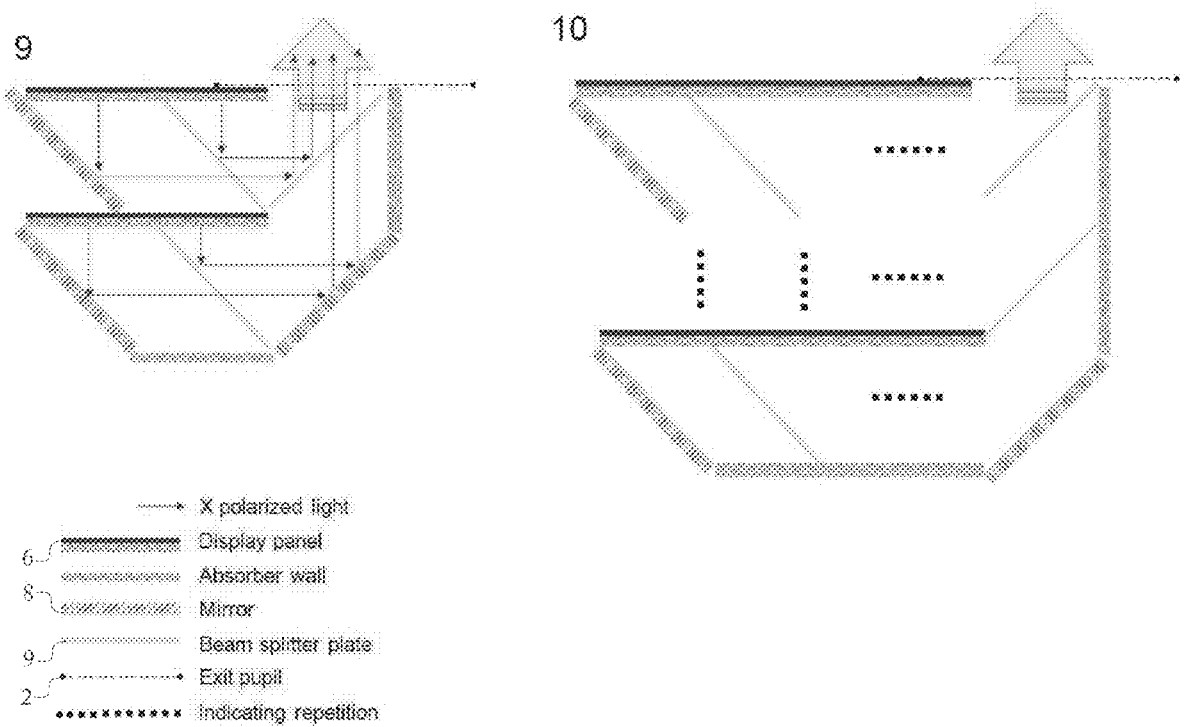
Figure 3C:
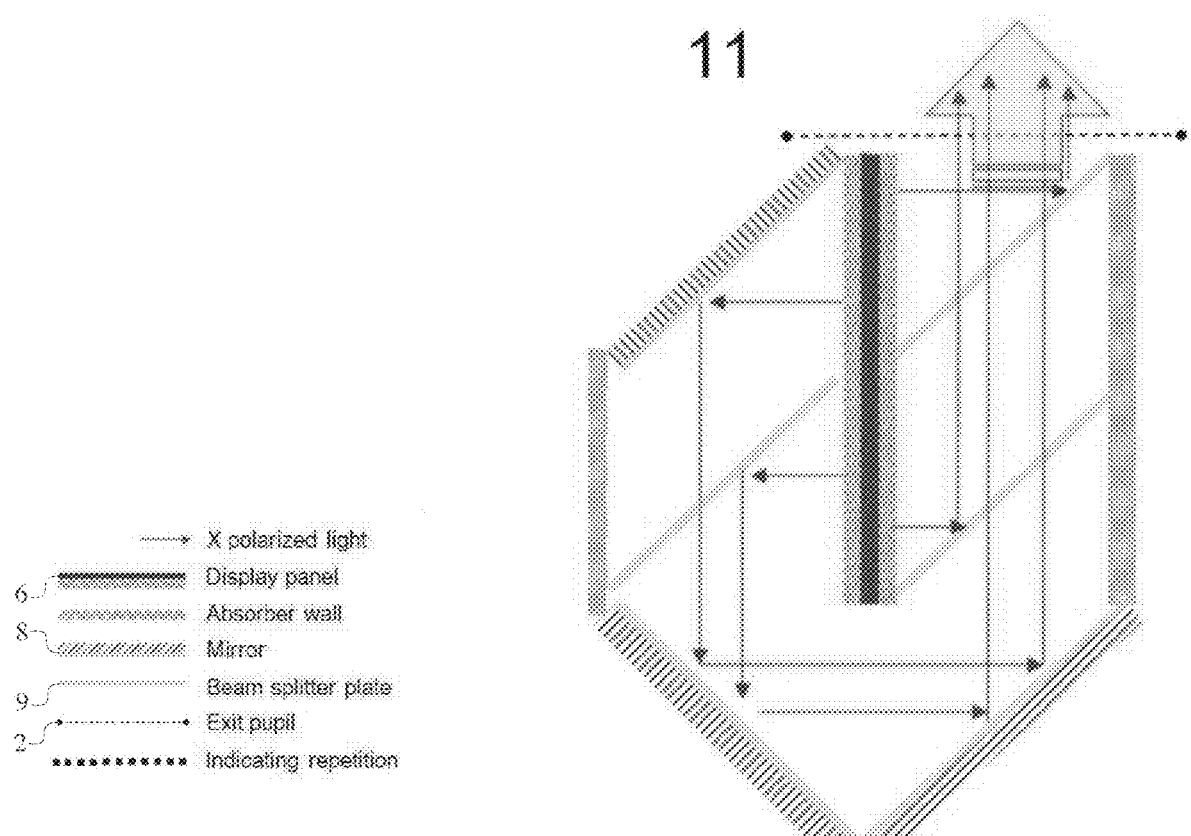

FIGS. 3A, 3B, and 3C illustrates some non-limiting instances of designs for Class I of field-evolving cavities 1. In general, the optical-tuning mechanism 7 may comprise at least one mirror 8 and at least one beam splitter plate 9. As can be seen from sections in FIG. 3, the specific cavity arrangement may be configured to reflect the optical path with the mirror 8, and the specific cavity arrangement may be further configured to reflect the optical path with the beam splitter plate 9, to pass the optical path through the beam splitter plate 9, or combinations thereof.

Section 5 of FIG. 3A illustrates an embodiment of a Class I of a field-evolving cavity 1 with a single display panel 6 at the bottom which produces only a single depth (included for theoretical support). The light directly travels out of the cavity exit pupil 2 without bouncing off any reflector or other optical surface(s). This is a cavity exit pupil 2 with zero order. The orange arrow shows the light bundle exiting the dashed line which is the cavity exit pupil 6 in all the figures in this disclosure. In all the figures, only the light that makes it out of the light-evolving cavity 1 is shown with red or blue arrows. The light that is wasted is not indicated in these drawings for simplicity. Also for any beam splitter plate 9, the percentage of reflectivity can be chosen in such a way to maximize the brightness uniformity of all layers. This does not change the architecture of the design, and, thus, the reflectivity percentage is not specified through this disclosure. The reflectivity percentage can be assumed 50% for all the designs for simplicity.

Section 6 in FIG. 3A illustrates an embodiment of a Class I field-evolving cavity 1 comprising a single display panel 6 on the right wall which produces digital content simultaneously at two different depths. By incorporating a beam splitter plate 9 (half-mirror sheet) and a mirror 8 to combine and redirect light out of the cavity exit pupil 2. The light from the upper portion of the display panel 6 reflects off a mirror 8, passes through a beam splitter plate 9 and half of its intensity is outputted through the cavity exit pupil 2. The light from the lower portion of the display panel 6 reflects off the beam splitter plate 9, and half of its intensity is directed toward the cavity exit pupil 2. Therefore, this is a Class I of a field-evolving cavity 1 with a first order, and the intensity of each focal plane is half of the original intensity of the display panel 6. In some examples of this type of field-evolving cavity 1, one or more of the reflectors might be shifted up or down to change the desired depth that is output to the cavity exit pupil 2.

Section 7 in FIG. 3A illustrates an extension of Section 6 in FIG. 3A, in which a single display panel 6 is used to generate digital content simultaneously at three different depths. In some embodiments, the optical efficiency of the field-evolving cavity 1 may be different for different depths, and, therefore, the brightness of the display panel 6 could be adjusted to accommodate this variation. For example, if the beam splitter plates 9 have 50% reflection and 50% transmission, the light from the topmost part of the display panel 6 passes through two beam splitter plates 9, and, thus, its intensity is reduced to 25% of the intensity of the display panel 6; the light from the middle section passes through two beam splitter plates 9 and also has 25% of the intensity for the display panel 6, but the light from the lowermost section only passes through one beam splitter plate 9, and, therefore, the intensity is 50% of the intensity of the display panel 6. To compensate for this variation in intensity across focal depths, the brightness on the lowermost part could be reduced by 50% electronically through the signal that is given to the display panel 6. Such brightness adjustments can be applied to the various configurations in FIGS. 3 through 13 to provide uniform brightness for different layers of the light-field.

Section 8 in FIG. 3A illustrates the ultimate extension of Section 6 in FIG. 3A, in which a single display panel 6 is used to generate digital content at an arbitrary number of depths.

Section 9 in FIG. 3B illustrates an extension of Section 6 in FIG. 3A in which two field-evolving cavities 1 (each producing content at two depths) are combined to generate digital content simultaneously at four different depths.

Section 10 in FIG. 3B illustrates an extension of Sections 8 and 9 in FIGS. 3A and 3B, in which multiple cavities 1 illustrated in Section 8 in FIG. 3A are combined as illustrated in Section 9 in FIG. 3B to generate digital content simultaneously at a plurality of depths.

Section 11 in FIG. 3C illustrates an extension of Section 9 in FIG. 3, in which two display panels 6 are positioned back to back to provide more compact form factor.

Figure 4:
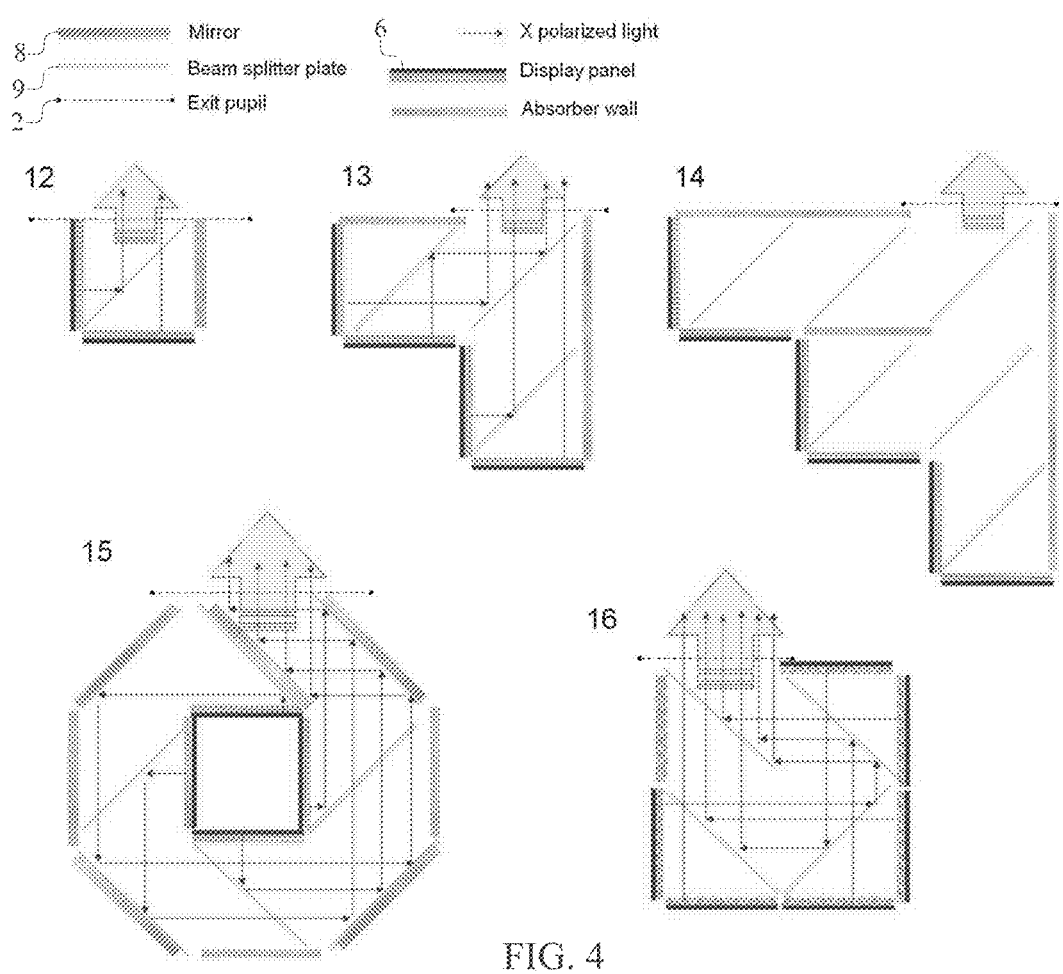
FIG. 4 illustrates instances of Class II FE cavities with first-order exit pupil, such that Class II displays can be arranged in two dimensions (both horizontal and vertical) to make up the cavity, wherein the term "first order" refers to the fact the light bounces from each mirror or reflector no more than once, and wherein more complex Class II FE cavity examples showing how multiple displays can be incorporated along two axes to avoid losing spatial resolution incurred when splitting a display in Class I cavities are shown, and wherein the orange arrow is the light bundle exiting the pupil of the cavity.

FIG. 4 shows non-limiting examples of designs for Class II field-evolving cavities 1 with the cavity exit pupil 2.

Section 12 in FIG. 4 illustrates an embodiment of a simple Class II field-evolving cavity 1 comprising two display panels 6 that are positioned perpendicularly to each other and that are combined with a single beam splitter plate 9. It has the benefit that the two display panels 6 can generate digital content simultaneously at two similar depths. By adjusting the position of one display panel 6, the depth separation between the two focal planes can be easily adjusted.

Section 13 in FIG. 4 illustrates an embodiment of a simple Class II of a field-evolving cavity 1 comprising four display panels 6 that are combined to generate digital content simultaneously at four different depths.

Section 14 in FIG. 4 illustrates the ultimate extension of Section 13 in FIG. 4, which generates digital content simultaneously at a plurality of different depths.

Section 15 in FIG. 4 illustrates an embodiment of a simple Class II field-evolving cavity 1 comprising four display panels 6 at the center that are combined to generate digital content simultaneously at four different depths.

Section 16 in FIG. 4 illustrates an embodiment of a simple Class II field-evolving cavity 1 comprising six display panels 6 that are combined to generate digital content simultaneously at six different depths.

Figure 5:
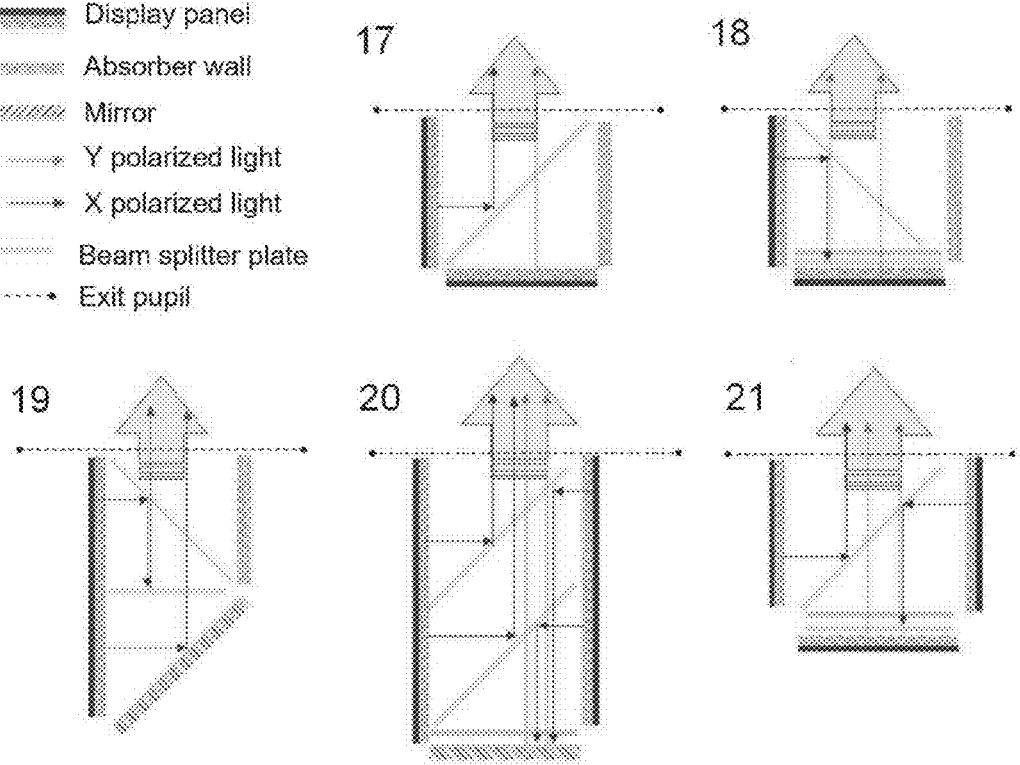
FIG. 5 illustrates instances of Class I and Class II FE cavities with first-order and second-order exit pupils designed to reduce the optical path difference to each focal plane and minimize light loss are shown; "second order" means that the light may bounce from a reflector up to two times, wherein examples of FE cavities with higher order exit pupil that are designed to reduce the optical path difference to each focal plane and minimize light loss by using polarization are shown.

FIG. 5 shows examples of Class I field-evolving cavities 1 and Class II field-evolving cavities 1 with higher-order exit pupils 2. These non-limiting examples show how polarization and multiple reflections from the same surfaces can create more compact cavities with a larger number of output focal planes. In general, the optical-tuning mechanism 7 may further comprise at least one polarization-dependent beam splitter plate 10 and at least one quarter waveplate 11. As can be seen from the sections in FIG. 5 the specific cavity arrangement may be configured to reflect the optical path in a first polarization with the polarization-dependent beam splitter plate 10, to pass the optical path in a second polarization through the polarization-dependent beam splitter plate 10, or combinations thereof, wherein the first polarization is the optical opposite of the second polarization. The specific cavity arrangement may further be configured to switch the optical path from a first linear polarization to a second linear polarization with a combination of the quarter waveplate 11 and the mirror 8, wherein the first linear polarization is perpendicular to the second linear polarization.

Section 17 in FIG. 5 illustrates an embodiment of a Class II field-evolving cavity 1 comprising two polarized display panels 6 that are combined with a polarization-dependent beam splitter plate 10. The polarization-dependent beam splitter (PDBS) plate 10 is a beam splitter plate or a reflector sheet that reflects one polarization fully and fully transmits the other perpendicular polarization. It has the benefit that the two display panels 6 can generate digital content simultaneously at two similar depths. By adjusting the position of one display panel 6, the depth separation between the two focal planes can be easily adjusted. It also has the benefit that light loss is minimized by leveraging the polarization of the display panels 6 in conjunction with the PDBS plate 10.

Section 18 in FIG. 5 illustrates an embodiment of a Class II field-evolving cavity 1 with second order that uses a PDBS plate 10 and waveplate 11 to efficiently generate two different focal planes (image depths). In this embodiment, the light from the vertical display panel 6 has a horizontal polarization and hits a PDBS plate 10 that only reflects light with horizontal polarization. Therefore, this light (shown schematically by red arrows) moves upward and passes through a quarter waveplate 11 (shown in purple). This quarter waveplate 11 changes the horizontal polarization to clockwise circular polarization, and then it hits a half mirror on top of the horizontal display (shown in blue), which will then reflect it back with counter-clockwise polarization. The quarter waveplate 11 converts that counter-clockwise circular polarization to vertical linear polarization (shown schematically with red arrows). This light passes through the PBDS plate 10 and leaves through the cavity exit pupil 2. Light from the horizontal display panel 6 has counter-clockwise polarization, and by passing through the quarter waveplate 11, the light is converted to vertical polarization which then passes through the PBDS plate 10. This process of using a quarter waveplate 11 alongside a reflective surface 8 can be used extensively in many other configurations for field-evolving cavities 1 as shown in FIGS. 5 through 10. The functionality is identical to the one described for this configuration: the waveplate 11 together with the reflective surface 8 reflects and rotates the polarization by 90 degrees. Therefore, if light with a horizontal polarization goes through those layers, the light reflects back with vertical polarization and vice versa. If a vertically polarized light reflects from this structure, the light will be reflected with horizontal polarization.

Section 19 in FIG. 5 illustrates an embodiment of a Class II field-evolving cavity 1 with second order comprising a single display panel 6 that is combined with a series of beam splitter plates 9 and a mirror 8. It has the benefit that a single display panel 6 can be used to generate digital content simultaneously at two similar depths. By adjusting the position of the central beam splitter plate 9, the depth separation between the two focal planes can be adjusted. This embodiment is a Class I field-evolving cavity 1 since there are display panels 6 only in one dimension, and this embodiment has the cavity exit pupil 2 at second order since the light from the lower part of the display panel 6, reflects once from the lower beam splitter plate 9, and then again by the horizontal half-mirror (it will also pass through the lower beam splitter plate 9 before exiting). Higher order field-evolving cavities 1 can provide more flexibility in terms of design and form factor, but they tend to be less light efficient.

Section 20 in FIG. 5 illustrates an embodiment of a Class II field-evolving cavity 1 with second order comprising two display panels 6, combined with a series of PDBS plates 10. The light from left display panel 6 is x-polarized, which is reflected from the reflectors 8 to the cavity exit pupil 2. The light from right display panel 6 is x-polarized, which is reflected downward and goes through the waveplate 11, hits the bottom mirror 8, and goes through the waveplate 11 again, which will shift its polarization to y-polarization, which would then pass through the PDBS plates 10.

Section 21 in FIG. 5 illustrates an embodiment of a Class II field-evolving cavity 1 with second order that is configured such that the light from the right display panel 6 is x-polarized, so the light reflects from the PDBS plates 10. The light from bottom display panel 6 has a polarization rotated through the waveplate 11 and passes through the diagonal PDBS plate 10 to the cavity exit pupil 2. The light from the right-side display panel 6 is reflected downward by the PDBS plate 10, goes through polarization rotation through waveplate 11, is half-reflected by the beam splitter plate 9 at the bottom, and then passes through the diagonal PDBS plate 10 to the cavity exit pupil 2.

Figure 6:
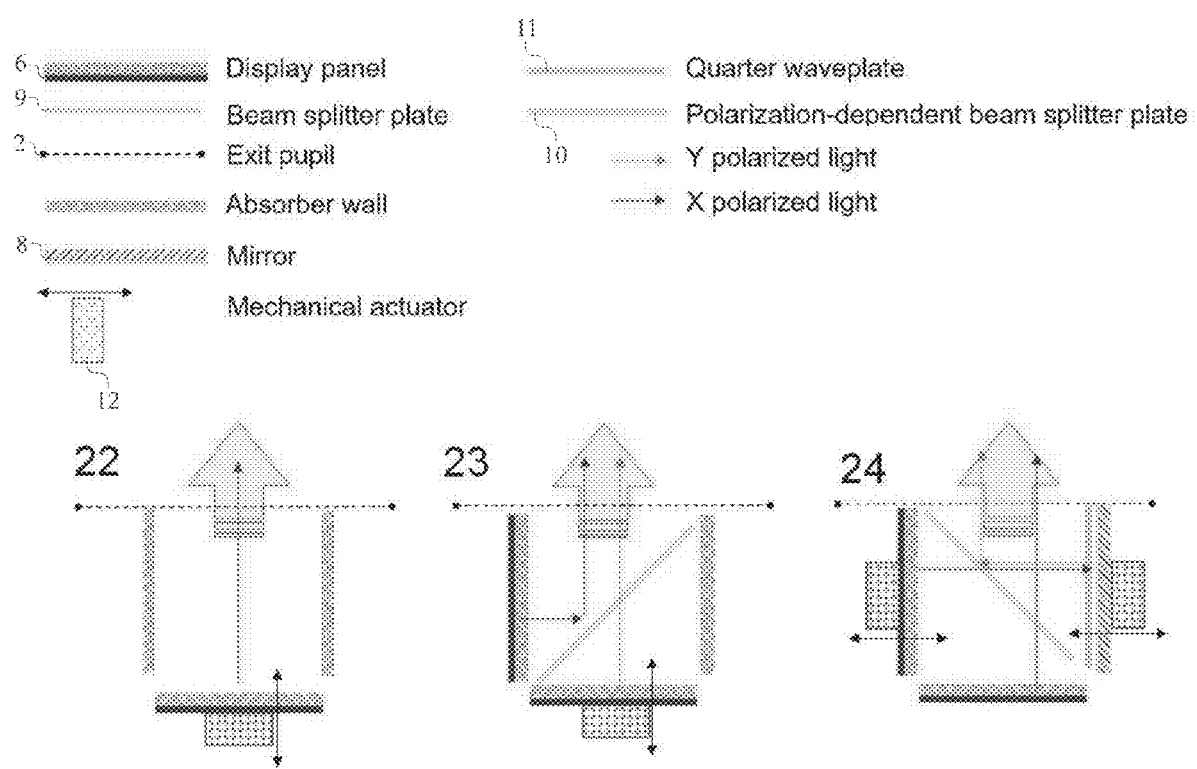
FIG. 6 illustrates examples of FE cavities with actively translated (mechanically translated) components used to adjust or sweep the focal plane through a range of depths, wherein instances of FE cavities with mechanically translated components to actively adjust or sweep the focal plane through a range of depths are shown.

In reference to FIG. 6, the optical-tuning mechanism 7 may further comprise at least one mechanical actuator 12. As can be seen in the sections from FIG. 6, the specific cavity arrangement may be configured to translationally move the display panel 6 with a mechanical actuator 12, and/or the specific cavity arrangement may be configured to translationally move the combination of the waveplate 11 and the mirror 8 with another mechanical actuator 12.

Section 22 in FIG. 6 illustrates an embodiment of a Class I field-evolving cavity 1 comprising a single display panel 6 which is swept through a plurality of physical positions to generate digital content at a plurality of depths. Such a field-evolving cavity 1 can either be used as part of an accommodation display panel 6, where the position of the display panel 6 is adjusted to correspond to the user's vergence depth, it can be continuously swept while continuously updating the digital content displayed (to produce a light-field), or if the digital content is at a known depth, it can simply be set to match the perceived depth of the digital content. This mechanical movement can be combined with a curved relay to increase the optical range of variations in depth. This is usually necessary since mechanical translation with large range is usually not practical. Varieties of solutions can be considered for these mechanical translations such as mechanical stages, piezoelectric translators, or voice coils.

Section 23 in FIG. 6 illustrates an embodiment of a field-evolving cavity 1 combining the embodiment shown in Section 22 in FIG. 6 and the embodiment shown in Section 17 in FIG. 5, which simultaneously generates digital content at two different depths, one of which is dynamically adjustable.

Section 24 in FIG. 6 illustrates an extension of Section 23 in FIG. 6, which includes a movable mirror 8 to enable a more rapid translation of the dynamically adjustable focal plane. It simultaneously generates digital content at two different depths, one of which is dynamically adjustable. Faster transitions can be achieved by using higher order field-evolving cavities 1; however, in general, the speed of depth translation will be slow if mechanical motion is used. The speed of translation is typically directly a function of order. An example of Section 24 in FIG. 6 is the speed of tunability or translation that doubled since the light hits the right mirror 8 and therefore goes back a delta variation in the position of the mirror 8, or the display panel 6 is doubled through the roundtrip of the light. Simultaneous transition of the right display panel 6 and the left mirror 8 can quadruple the speed and range of depth variation in this example.

Figure 7:
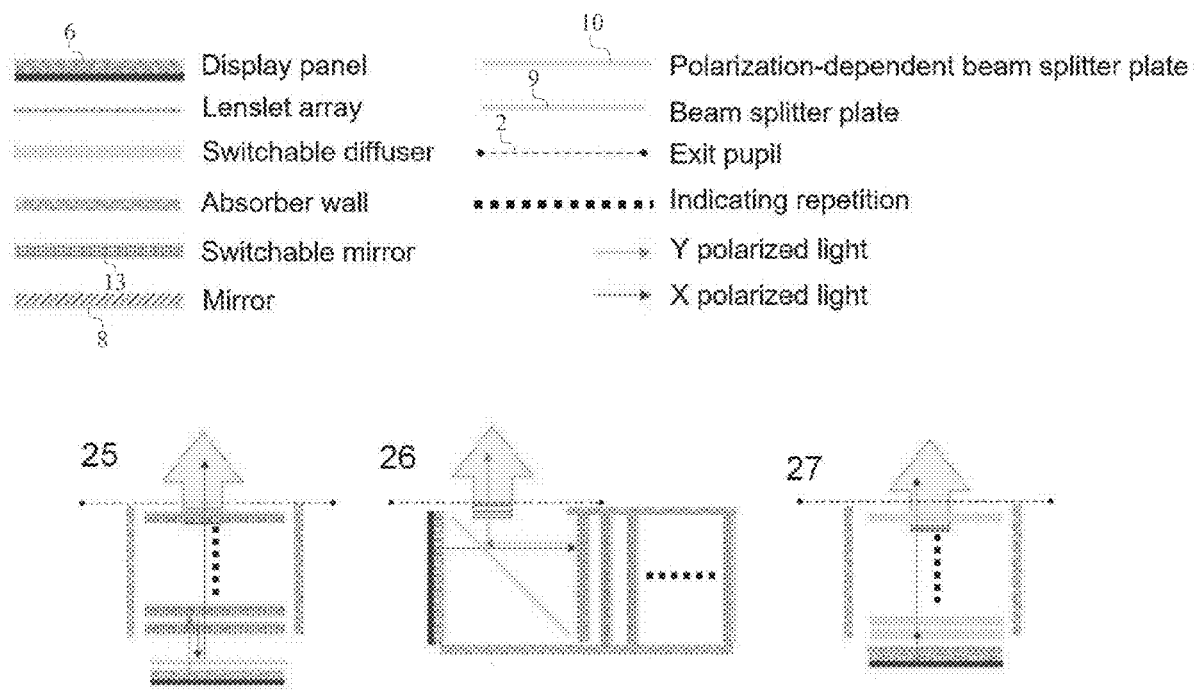
FIG. 7 illustrates instances of FE cavities that involve switchable mirror elements and switchable diffusers to change the focal depth of the exiting light, and wherein examples of display cavities using switchable mirrors (from Profiles 22, 23 in FIG. 6) and switchable diffusers (from Profile 24 in FIG. 6) to vary the display focal plane without gross mechanical motion are shown.

In reference to FIG. 7, the optical-tuning mechanism 7 may further comprise a plurality of switchable mirrors 13 that are in serial optical communication with each other and are positioned offset from each other. As can be seen from the sections in FIG. 7, the specific cavity arrangement may be configured to selectively alternate between reflecting the optical path with at least one specified mirror from the plurality of switchable mirrors 13 and passing the optical path through the specified mirror.

Section 25 in FIG. 7 illustrates an embodiment of a field-evolving cavity 1, which utilizes a polarized display panel 6 and a stack of polarization-dependent switchable liquid crystal mirrors 13 to produce digital content at a plurality of depths, each of which is determined by the switchable mirror 13 that is activated (the one which reflects the light). There are many technologies that provide functionality for a switchable mirror 13, and a non-limiting example of a switchable mirror 13 is a liquid crystal cell (LCC) placed on top of a polarization-dependent reflector. If the incident light has the same polarization as the polarization axis of the reflective surface, the light will reflect from the switchable mirror 13. If the LCC is turned on so that the LCC makes the incident light cross polarized with the reflective polarizer, the light passes through, and the mirror is rendered as transparent. There are other technologies for switchable mirrors 13 that use photorefractive or other electro-optical materials.

Section 26 in FIG. 7 illustrates a variant of Section 25 in FIG. 7, which utilizes a folded structure to double the depth separation imparted upon the output focal plane in comparison to the physical separation of the switchable mirrors 13. The depth that exits the cavity exit pupil 2 is defined by which switchable mirror 13 is turned on to reflect the light. These switchable mirrors 13 can be switched on and off with speeds comparable to the switching speed of liquid crystal material (tens of nanoseconds). In this architecture, each frame can be reflected from a different depth out of the field-evolving cavity 1 and therefore different layers in the light field can be scanned electronically and sequentially. Sequential scanning of the layers by turning on one of the switchable mirrors 13 at a time is not necessarily the most efficient way to scan the entire depth of light-field and one may use computational approaches to turn on and off switchable mirrors 13 inside the field-evolving cavity 1 in such a way as to increase overall light efficiency or brightness of the used depth. For example, if there is content only on the closest depth, there is no need to allocate more empty frames to another deeper depth. In other words, the signal to feed the display panel 6 and the switchable mirrors 13 can be processed in such a way as to maximize the frame rate and brightness dynamically at active depths.

Section 27 in FIG. 7 illustrates is an embodiment of a field-evolving cavity 1, which uses a microlens array to collimate a display panel 6 and to project digital content onto a stack of switchable diffusers. This embodiment produces digital content at a plurality of depths, each of which is determined by which diffuser is set to be diffusive. In addition, if the switchable diffusers are driven in such a way that a spatially varying diffusion is achieved, it is possible to produce a diffusive surface which is non-planar, thereby creating an output focal plane which is non-planar. The spatially varying depth of this output focal plane can then be dynamically adjusted to match the spatially varying depths of the digital content being displayed. There are many technologies available for switchable diffusers; most of these technologies depend on polymer stabilized cholesteric texture (PSCT) light shutter technology. Another way to realize Section 27 in FIG. 7 is to use polarization-dependent diffusers, which scatter light at one polarization and transmit the light at the other perpendicular polarizations. This will require a layer of liquid crystal on top of the lenslet to rotate polarization, which would correspond to different diffusers diffusing the light at different depth. Although this is theoretically viable, such arrangement would most likely produce haze artifact for deeper layers.

Figure 8:
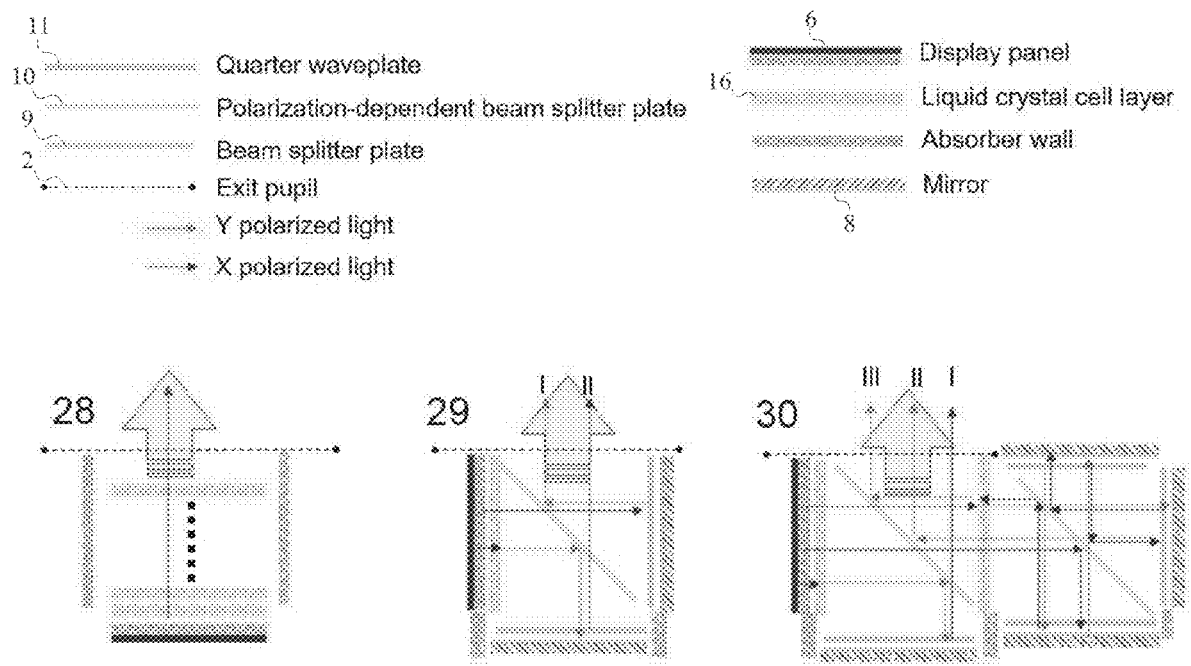
FIG. 8 illustrates examples of using switchable liquid crystal layers to switch the path that light takes inside different sections of the FE cavity, wherein instances of FE cavities using switchable liquid crystal layers to vary the display focal plane without any mechanical motion are shown.

In reference to FIG. 8, the optical-tuning mechanism 7 comprises at least one liquid crystal cell layer 16. As can be seen from the sections in FIG. 8, the specific cavity arrangement may be configured to switch the optical path from a first linear polarization to a second linear polarization with a liquid crystal cell layer 16, to tune a refractive index of the optical path with the liquid crystal cell layer 16, or a combination thereof, wherein the first linear polarization is perpendicular to the second linear polarization.

Section 28 in FIG. 8 illustrates an extension of Section 25 in FIG. 7, which generates different depths by virtue of the birefringence of transmissive liquid crystal cell layers 16 that are positioned on top of the display panel 6. As more or fewer of the stack of liquid crystal cell layers 16 is activated, the apparent refractive index between the display panel 6 and the cavity exit pupil 2 can be dynamically tuned. As such, this extension can generate digital content at a plurality of different depths. The amount of required variation in refractive index depends upon the design of the optical relay mechanism 3 that couples to the cavity exit pupil 2. If the optical relay mechanism 3 magnifies perceived depth, small variations in the optical path can result in large shifts in the focal plane depth that are perceived by the user.

Section 29 in FIG. 8 illustrates an alternative to Section 28 in FIG. 8, which can provide significantly larger depth steps and thereby a larger depth variation range for the focal plane compared to Section 25 in FIG. 7. It is an embodiment of a Class I field-evolving cavity 1 with a single polarized display panel 6, light from which passes through a liquid crystal cell layer 16 capable of rotating incident polarization. Because of the construction of the rest of the field-evolving cavity 1 (with a polarization-dependent beam splitter plate 10 and quarter waveplates 11/mirrors 8 as illustrated in FIG. 8), it is possible to use the liquid crystal cell (LCC) layer 16 to switch between two output depths. In some embodiments, the LCC layer 16 does not have a 2D matrix on it and is essentially a LCC layer 16 that rotates the polarization by 90 degrees once biased. As such, it can generate digital content at two different planes, the selection of which is determined by the state of the liquid crystal cell layer 16 (and the cavity's physical construction). In the illustrated embodiment, the display panel 6 produces horizontally polarized light (blue arrows). If the LCC layer 16 is off, the light passes through the LCC layer 16 with the same polarization, then passes through the polarization-dependent beam splitter plate 10, then hits the quarter waveplate 11 and reflector 8, then reflects with vertical polarization, then hits the beam splitter plate 9, and exits the cavity exit pupil 2 (Beam I). If the LCC layer 16 is on (biased with electricity), then the polarization rotates 90 degrees and becomes vertical, reflects from the beam splitter plate 9, goes upward, reflects off the quarter waveplate 11/mirror structure 8 resulting in horizontal polarization, and passes through the polarization-dependent beam splitter plate 10 (Beam II).

Section 30 in FIG. 8 illustrates an extension of Section 28 in FIG. 8, which allows for one display panel 6 to generate digital content at three different depth planes, the selection of which is determined by the state of two liquid crystal cell layers 16 (and the physical construction of the field-evolving cavity 1). In addition, it can provide significantly larger depth steps and thereby a larger depth variation range for the focal plane compared to Section 25 in FIG. 7. Each liquid crystal cell layer 16 acts like a 2D optical valve that preserves the angular information and defines which path the light is going to take depending on the state of its polarization. Based on the state of the LCC layers 16, the three depths of I, II, and III can be generated. For example, considering that the display panel 6 has horizontal polarization, in this design, depth I is generated when LCC1 is on (LCC2 is not used for depth I). Depth II is generated when LCC1 is off and LCC2 is off. Depth III is be generated when LCC1 is off and LCC2 is on. Theoretically, this design can be extended to an infinite number of field-evolving cavities; however, each time another field-evolving cavity is added, some portion of the light will be lost, and the efficiency will be reduced.

Figure 9:
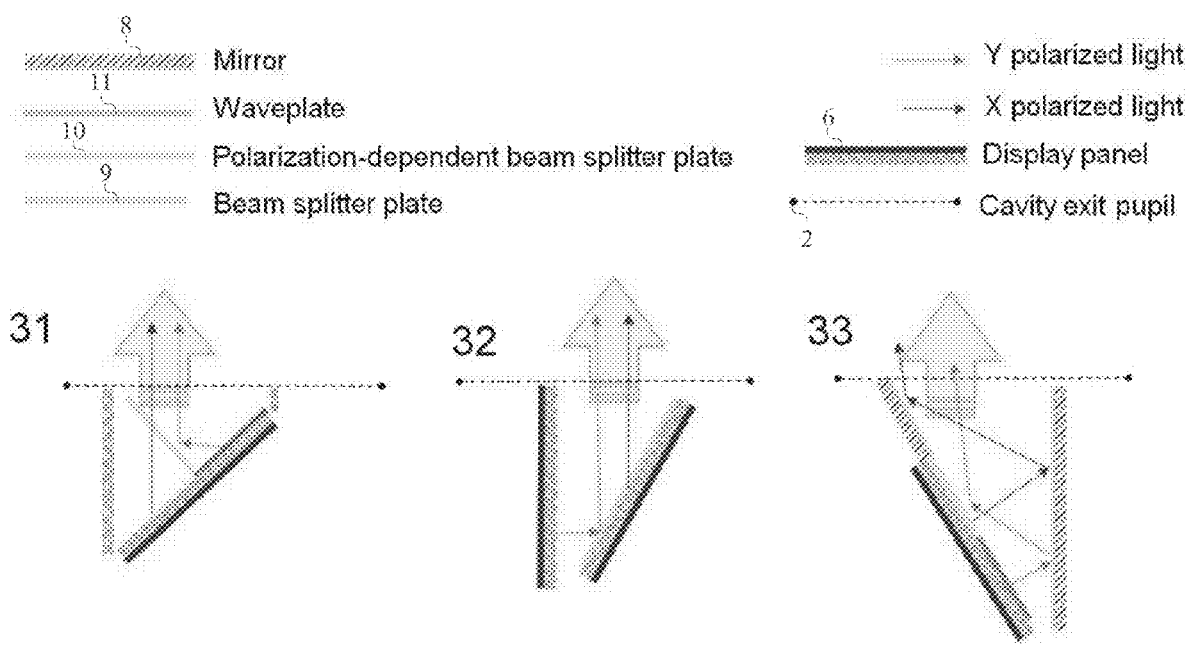
FIG. 9 illustrates examples of wedge type (or angled) FE cavities used to produce multiple focal planes, wherein in such cavities the display plane normal vectors may make angles other than multiples of 90 degrees with regards to each other, and wherein examples of compact Class I and II wedge cavities used to produce multiple focal planes in smaller form factors are shown.

Section 31 of FIG. 9 illustrates a compact wedge cavity extension of Section 12 of FIG. 4, which uses a single display 6 instead of two display panels 6 to generate digital content simultaneously at two similar depths. By adjusting the position of the single polarization-dependent beam splitter plate 10, the depth separation between the two focal planes can be easily adjusted. It also has the benefit that light loss is minimized by leveraging the polarization of the display panel 6 in conjunction with the polarization-dependent beam splitter plate 10 and a waveplate 11.

Section 32 of FIG. 9 illustrates a compact Class II variation of Section 12 of FIG. 4, which uses two polarized display panels 6 and a polarization-dependent beam splitter plate 10 to generate digital content simultaneously at two similar depths. By adjusting the position of the display panels 6, the depth separation between the two focal planes can be easily adjusted.

Section 33 of FIG. 9 illustrates is a compact Class I wedge for a field-evolving cavity, which uses a polarized display panel 6 to generate digital content simultaneously at two depths. The angle may cause the light to exit the cavity exit pupil 2 at a desired angle.

Depth and Brightness Enhancement Mechanisms

The depth of each layer in the light field can be tuned by using glass or other high refractive index materials within the field-evolving cavity 1 or at the cavity exit pupil 2. Additionally, the brightness of the layers can be enhanced by using prismatic films on the display. The display panels 6 in the field-evolving cavity 1 usually have a Gaussian wide-angle profile with peak intensity at the center; this is not always beneficial in a cavity-based light-field where the reflection from a display panel 6 might be at an oblique angle. Placing prismatic films on the display panel 6 can help to tilt the peak intensity of the gaussian profile to a certain desired angle to get brighter output for that layer of the screen. The reason that high refractive index glass windows reduces the depth is that it refracts the light into a smaller cone than the original cone of the light, and, therefore, the perceived depth appears to be slightly smaller, or less deep.

Figure 10:
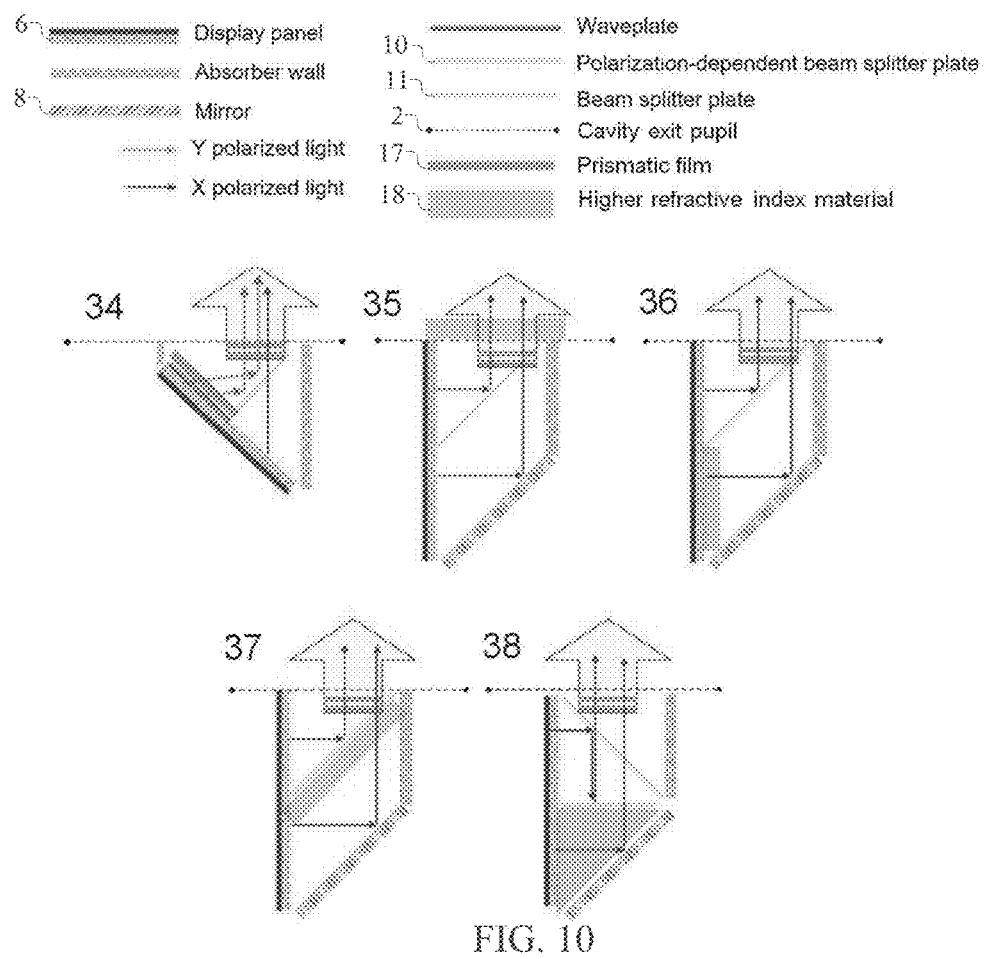
FIG. 10 illustrates instances in which one or all of the depth is shifted using higher refractive index slabs or prisms, wherein it also shows how prismatic film can improve the brightness of a focal plane, and wherein examples of passively tuning or enhancing the depth and brightness of focal planes using material with different refractive index within the cavity volume or prismatic films are shown.

In reference to FIG. 10, the optical-tuning mechanism 7 may further comprise at least one prismatic film 17 and at least one piece of higher refractive index material 18. As can be seen from the sections from FIG. 10, the specific cavity arrangement may be configured to enhance a brightness of the optical path with the prismatic film 17, and/or the specific cavity arrangement may be configured to lower a depth of the focal plane along the optical path with the piece of higher index material 18.

Section 34 of FIG. 10 illustrates an example case where a prismatic film 17 can increase the brightness by tilting the peak of the gaussian profile of the intensity toward the reflector. Prismatic films 17 always help if the cavity exit pupil 2 looks at the display panel 6 in any angle other than 90 degrees angle.

Section 35 of FIG. 10 illustrates an example of Class I field-evolving cavity 1 with a first order of the cavity exit pupil 2, where both of the depths are perceived to be slightly less deep inside the field-evolving cavity 1 due to high refractive index 18 at the cavity exit pupil 2.

Section 36 of FIG. 10 illustrates is an example of Class I field-evolving cavity 1 with a first order of the cavity exit pupil 2, where deeper focal plane has become slightly less deep to the cavity exit pupil 2 due to high refractive index 18 on the display panel 6.

Section 37 of FIG. 10 illustrates is an example of Class I field-evolving cavity 1 with a first order of the cavity exit pupil 2, where deeper focal plane has become slightly less deep to the cavity exit pupil 2 due to high refractive index 18 on the back of the reflector 8 for the closer depth.

Section 38 of FIG. 10 illustrates is an example of Class I field-evolving cavity 1 with a first order of the cavity exit pupil 2, where deeper focal plane have become notably less deep to the cavity exit pupil 2 due to high refractive index 18 on the entire lower section of the field-evolving cavity 1. In essence, the bottom reflector 8 is replaced with a high refractive index prism 18.

Relay Mechanisms and Application Modalities

As mentioned previously, the cavity exit pupil 2 delivers light into a relay mechanism 3, resulting in different reference apexes of divergence for different focal planes being presented to the user. The relay mechanism 3 can be an off-axis visor, a geometrical or diffractive waveguide, a birdbath design beam splitter, or any other suitable relay means.

Figure 11:
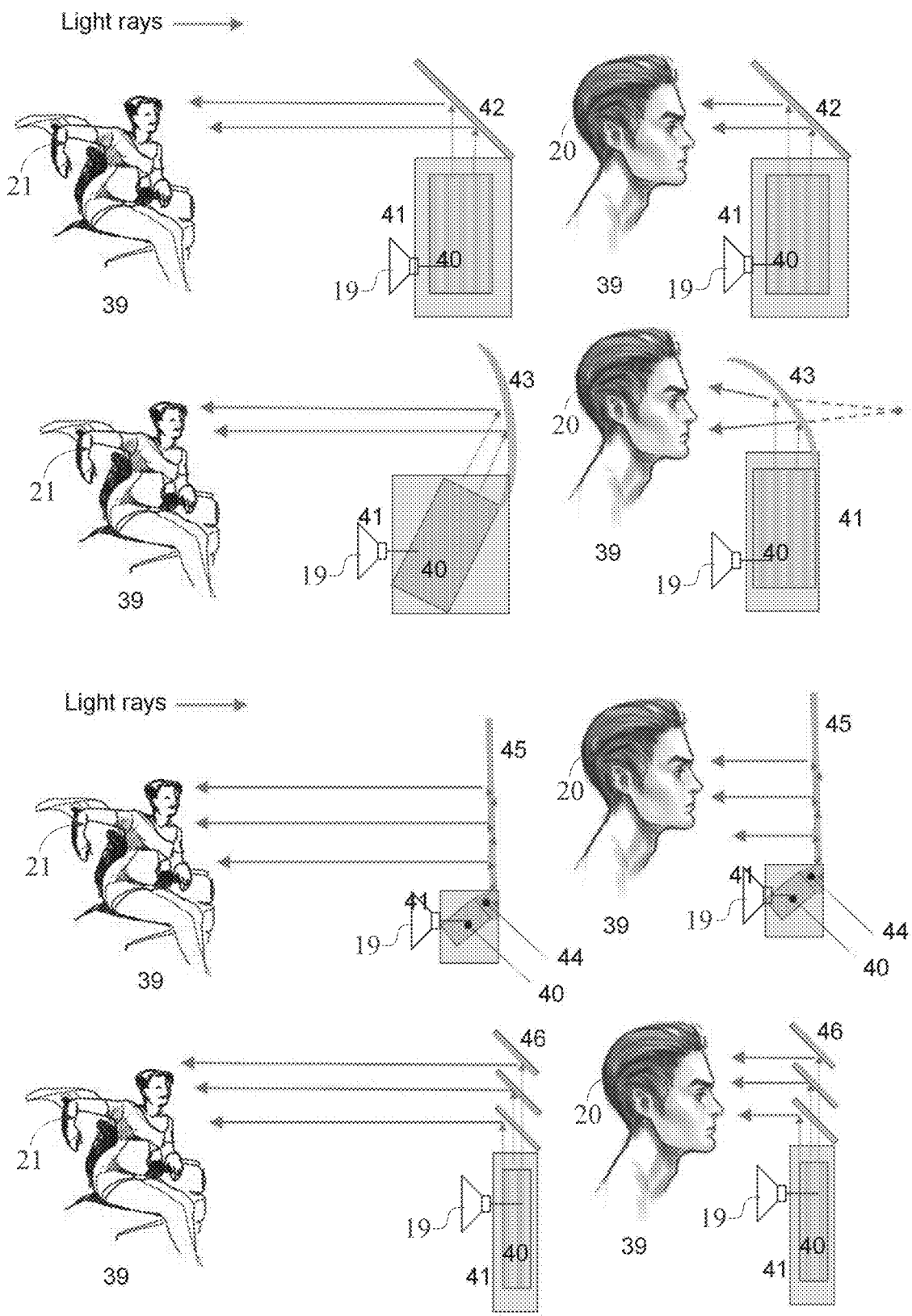
FIG. 11 illustrates instances of a relay system that can be used to relay light from the cavity to the outside world, wherein the display might be used as a far standing display or used very close to the head as on a desktop, and wherein the relays might be fully transparent or opaque, curved or flat, one piece or comprising multiple switching sections, and wherein diagrams show how display cavities' outputs can be relayed to the viewer as part of an entertainment system or a magnified monitor, and wherein the left column shows entertainment system modalities, and wherein the right side shows magnified near-head display modalities.

FIG. 11 and the following descriptions provide non-limiting examples of relay mechanism 3 which can be used to direct the output of a field-evolving cavity 1 to the viewer. In one example, the light exits the cavity exit pupil 2 onto a visor and moves toward the eye. In another example, the light exits a smaller cavity and is fed to a large-size waveguide that then redirects the light toward the viewer.

In reference to FIG. 11, the diagram showing how the output of the field-evolving cavity 1 can be relayed to the viewer as part of an entertainment system or a magnified monitor. The left column shows entertainment system modalities, and the right column shows magnified near-head display modality. In general, a near-head mount 20 may be operatively coupled to the system enclosure 5, wherein the near-head mount 20 is used to position the system enclosure 5 adjacent to a user's head. Moreover, an entertainment stand 21 is operatively coupled to the system enclosure 5, wherein the entertainment stand 21 is used to position the system enclosure 5 offset from a user's head. Furthermore, at least one audio output device 19 is electronically connected to the display panel 6.

Reference 39 in FIG. 11 illustrates the viewer either in near-head modality 20 or entertainment system modality 21 where the viewer is farther than 60 centimeters (cm) from the display.

Reference 40 in FIG. 11 illustrates a generalized display cavity (i.e. the at least one field-evolving cavity 1) producing digital content (stereoscopic or 2D) at one or more depths.

Reference 41 in FIG. 11 illustrates the casing (i.e. the system enclosure 5) of the at least one field-evolving cavity 1 that holds the rest of the electronics of the system.

Reference 42 in FIG. 11 illustrates an example of an angled reflector relay (i.e. the relay mechanism 3) where a reflective, semi-reflective or switchable mirror surface is used to relay the cavity exit pupil 2 to the enclosure exit pupil 4 and therefore the viewer.

Reference 43 in FIG. 11 illustrates an example of a curved angled reflector relay (i.e. the relay mechanism 3) where a curved reflective, semi-reflective, or switchable mirror surface is used to relay the cavity exit pupil 2 to the enclosure exit pupil 4 and therefore the viewer. The curvature of this relay can change the depth of the content coming from the original depth of the cavity to further or closer distances.

Reference 44 in FIG. 11 illustrates a coupling optics that couples the cavity exit pupil 2 to the entrance pupil of the waveguide (i.e. the relay mechanism 3).

Reference 45 in FIG. 11 illustrates a geometrical or diffractive waveguide (i.e. the relay mechanism 3), which redirects the output of FE Cavity (made with LCoS and reflectors or DMD and reflectors or LCD panels and reflectors or array of projectors) to the viewer. These waveguides can be multimode geometrical, diffractive, or real single mode-confined waveguides.

Reference 46 in FIG. 11 illustrates a compressed relay system (i.e. the relay mechanism 3) that will be further detailed in the next section of this disclosure. The compressed relay system helps to have more compact form-factor for the display.

Compressed Designs

Figure 12:
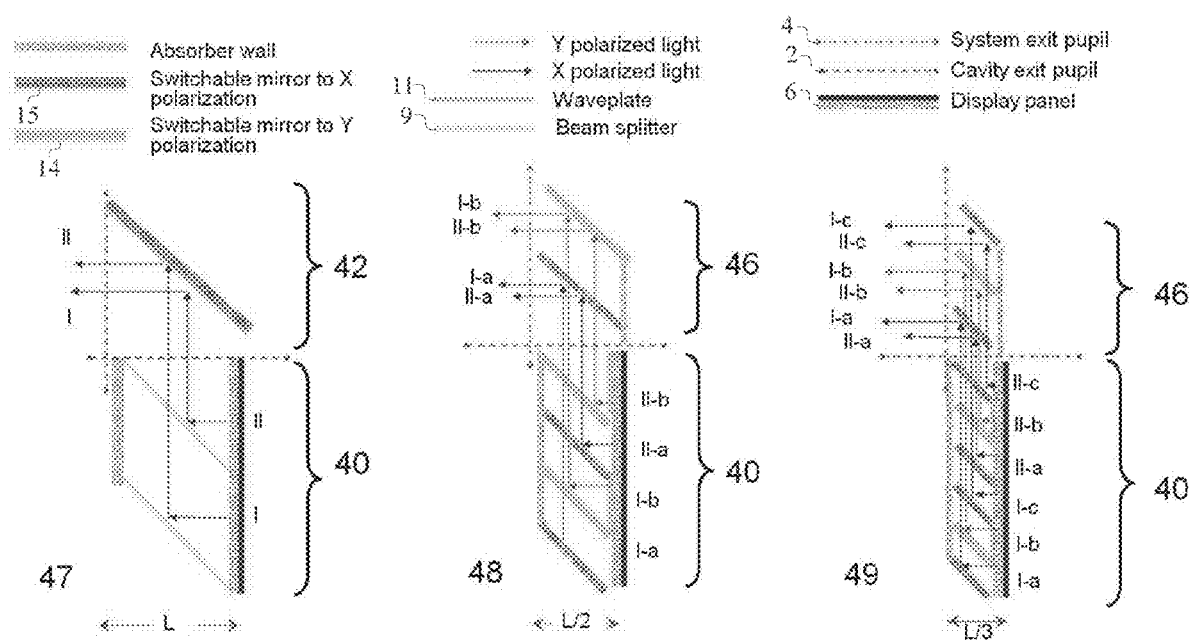
FIG. 12 illustrates instances of compressed FE cavities based on switchable mirrors, wherein the thickness of the cavity (L) can be reduced by having the reflectors turned on and off sequentially, and wherein diagrams show how the compressed architecture with switchable mirrors in Class I FE cavities can compress the size of the system.

The single reflectors can be bulky both inside the FE cavity 1 and as the relay. FIG. 12 shows few non limiting examples of such compressed designs based on spatial stacking of switchable mirrors.

In reference to FIG. 12, an operative combination of the at least one field-evolving cavity 1 and the relay mechanism 3 may comprise a plurality of switchable mirrors that are in serial optical communication with each other and are positioned offset from each other. Moreover, the plurality of switchable mirrors may comprise a plurality of first switchable mirrors 14 and a plurality of second switchable mirrors 15 so that the plurality of first switchable mirrors 14 is interspersed amongst the plurality of second switchable mirrors 15. As can be seen in the sections of FIG. 12, the specific cavity arrangement being configured to selectively alternate between reflecting the optical path in a first polarization with at least one specified first switchable mirror from the plurality of first switchable mirrors 14 and passing the optical path through the specified first switchable mirror, while the specific cavity arrangement is further configured to selectively alternate between reflecting the optical path in a second polarization with at least one specified second switchable mirror from the plurality of second switchable mirrors 15 and passing the optical path through the specified second switchable mirror. This allows the plurality of first switchable mirrors 14 and the plurality of second switchable mirrors 15 to be configured to compress an occupying volume of the operative combination of the at least one field-evolving cavity 1 and the relay mechanism 3. Section 47 of FIG. 12 shows an example system where there is no compression with Class I FE cavity 1 and two depths, similar to Section 6 in FIG. 3A. The light exits the cavity exit pupil 2 (shown by blue dashed line), reflects from Reference 42 in FIG. 12 (i.e. the relay mechanism 3), and exits the enclosure exit pupil 4 (shown in the red dashed line). The deeper light I is coming from depth I, and the light II is coming from a closer distance inside the field-evolving cavity 1. The system is obligated to have minimum thickness of L obligated by the dimensions of the display panel 6. For the same dimensions of the display panel 6, Section 48 of FIG. 12 reduces the thickness to half (L/2). This compression is obtained by having a stack of relays which are transparent relative to which other either by means of temporal switching of the switchable mirrors or by polarization. Therefore, in Section 48 of FIG. 12, the deeper depth I has two sections I-a and I-b which are relayed at two different distances; the distances in relay work in such a way that I-a and I-b both end up having the same depth as depth I but will span the same size for the enclosure exit pupil 4 as in Section 47 of FIG. 12. The same thing is happening for the closer depth II. The depth is diced into two relays which expand the enclosure exit pupil 4 but have less thickness. This approach can be extended for further compression. Moreover, Section 49 in FIG. 12 shows the case where the thickness in relation to Section 47 of FIG. 12 is compressed by factor of three. Here each depth level is spatially multiplexed to three sections which are compensated by the height of the three relay switchable mirrors 14, 15. For example, the paths that I-a and I-b and I-c travel to the enclosure exit pupil 4 (shown in the red dashed line) are equal, and, thus, all of them have the same depth as depth I. However, they exit at different heights, therefore expanding the enclosure exit pupil 4 back to the size of the enclosure exit pupil 4 in Section 47 of FIG. 12.

Example Prototype

Figure 13:
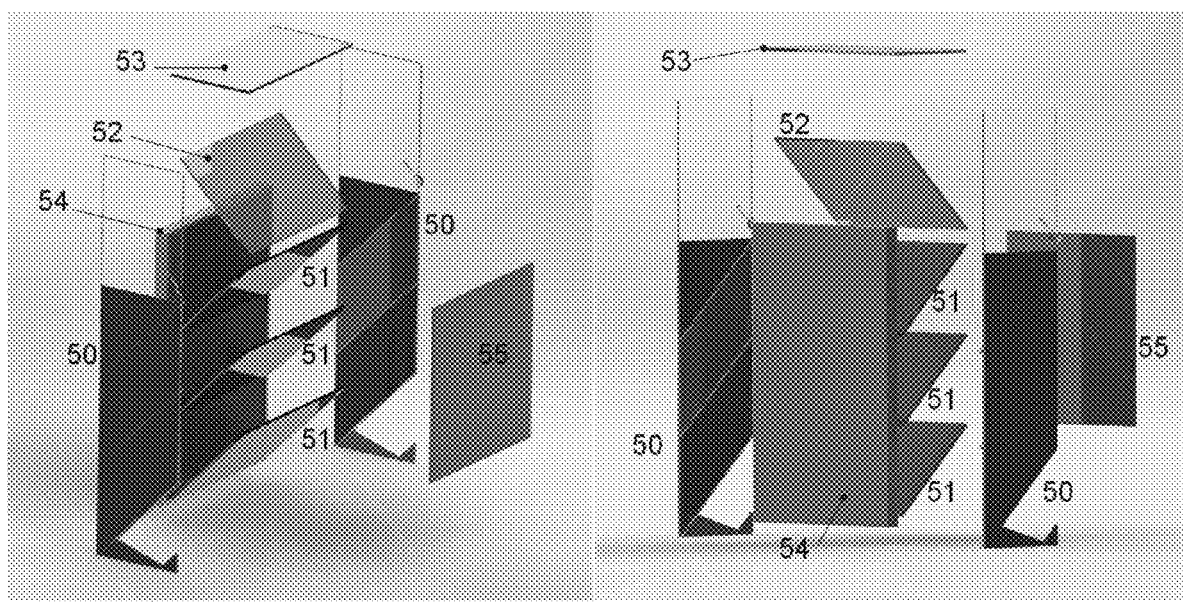
FIG. 13 illustrates the exploded view of a prototype model of a three-layer light-field display, wherein a 3D model of a prototype system is shown, and wherein the left panel is the back of the exploded model, while the right panel is the front of the display, and wherein the light-field exits the green reflector on top.

FIG. 13 shows the exploded 3D model of a prototype system, previously shown with no details in FIG. 1, with three depths from the back on the left and from the front on the right. The components are as below:

Reference 50 in FIG. 13 (i.e. components of the system enclosure 5) are side holders of the assembly. Reference 51 in FIG. 13 (i.e. components of the optical tuning mechanism 7) are reflective or semi-reflective surfaces. Reference 52 in FIG. 13 is a simple reflective mirror working as the relay mechanism 3. Reference 51 in FIG. 13 (i.e. component of the system enclosure 5) is a top cap just for protection of the relay mechanism 3. Reference 54 in FIG. 13 (i.e. the display panel 6) is an LCD panel that is divided at three depths. Reference 55 in FIG. 13 (i.e. component of the system enclosure 5) is a back cover of the FE cavity 1.

Advantages and Improvements Over Existing Methods

The arrangements, methods, and assembly of components in this description confer a variety of advantages and improvements over existing 3D systems:
Ergonomic advantages and improvements
Accommodation-vergence conflict mitigation—the present invention described herein can produce digital content at multiple depths with true monocular optical wavefront. The flexibility of display digital content at multiple depths enables the presentation of digital content at an optical depth which matches or is similar to the binocular disparity depth cue presented to the viewer, thereby helping to resolve any accommodation-vergence conflict experienced by the viewer. Mitigating accommodation-vergence conflict makes the digital content more comfortable to view for extended periods of time and increases the sense of realism experienced by the user viewing the digital content.
Size reduction—Because the present invention allows for folding of optical paths, it offers flexibility in terms of packaging compared to systems that use projectors. This enables smaller systems.
Unlike autostereoscopic 3D systems, which are limited in view zone distance and angle, and sometimes allow only few viewers to see the 3D content, the present invention allows up to a 150-degree (depending on number of depths) viewable angle and does not have limitation in number of users.
The FE cavities 1 can be combined with any type of panels and light engines so they are not limited to a specific technology; if needed, they can also use autostereoscopic displays as an engine to enhance their performance in depth accuracy.
Reduced cost—As opposed to using eye-tracking-based accommodation displays or holographic displays, the present invention can utilize readily available components (flat display panels) which are ready for mass production, significantly reducing overall system cost and technical challenges.
Since a FE cavity 1 system allows true optical depth, they allow the enclosure exit pupil 4 to sit very close to the eye without any eye fatigue since the true optical depth of the images can be far back. Unlike stereoscopic displays, this opens a whole new set of possibilities for near-head displays where the size of the display can be magnified with no need to wear anything or have a large screen.
For most of the designs with a passive glass reflector or even switchable mirrors herein, the images provided by FE cavities 1 have no artifacts such as haze, color nonuniformity, distortion, and moiré artifacts.
Performance advantages and improvements
Bandwidth reduction—The present invention as described herein allows for solving or mitigating accommodation-vergence conflict without having to present the entire 5D plenoptic function to the viewer. This reduces the complexity of content rendering and can improve system frame rates compared to full light-field displays. The bandwidth can be reduced by orders of magnitude.
Optical efficiency flexibility—The present invention is flexible in that if optical efficiency is a priority, a design can be chosen that has high light throughput. If display brightness is not needed, additional flexibility exists to add more display planes or use simpler cavity designs.
Spatial resolution flexibility—The present invention is flexible in that spatial resolution can be maintained by using multiple display panels 6. If spatial resolution is not needed (for instance, if individual pixels are already not resolvable by the user), the present invention can utilize unnecessary spatial resolution to render a different depth plane, improving the user experience.
Expandability—FE cavities 1 are conveniently expandable in architecture, number of planes and expansion to different display systems.
Compatibility—The present invention introduced herein has significant advantages in compatibility, both on the software level and on the hardware level. At the software level, since the light source can be ultimately a 2D screen, the feed to the display system can be easily fed with conventional standard signals. Also, this simplifies the rendering as there is no fundamental need for significant computational processing of the input due to depth providing optics.

The hardware architecture is integral to a wide variety of existing 2D display systems.

Functional advantages and improvements

Monitor magnification—Since the depth of the systems disclosed herein are true optical depths, the eye can accommodate and view these 3D contents with no discomfort at any given distance of the display. For example, if the display is 20 cm away from the head, but the depth that is shown is still 2 meters, the viewer sees the image as being 2 meters away and can use the monitor even at such a close distance. This helps to magnify small sized monitors using true optical depth provided by disclosed systems.

Heads up displays—The relay can be semitransparent since the depth can be much further than the actual position of the display, which makes a perfect case for large-scale superposition of the image and the real world, especially in the context of the heads up display.

Entertainment—The light-field experience provides a better sense of realism due to accurate optical depth and artifact free images. This can be used for home entertainment, gaming, and commercial entertainment applications.

Commercial Applications

Many commercial applications become possible with the dramatic accuracy in depth, transparency of the screen, and sense of immersion. What follows is a non-exhaustive list of possible applications:

Navigation

Turn-by-turn directions while driving/piloting/etc., using heads up displays without having to look away from the road or fumble with a phone or separate navigation device.

Medical

Better investigation of 3D data files using the light-field displays.

Workplace Ergonomics

Magnified displays can provide a convenient replacement for large displays without the need to wear any hardware or the need to have a large screen. The 3D nature of the display can provide a volume for office work with pixel accuracy that is equal to the standard monitors today.

Entertainment

The layered nature of FE cavities 1 provides ease in content generation from game and video industries. This is because rendering in a few layers to provide 3D effect is much easier (less computationally demanding) than rendering the entire 3D environment.

The FE cavities 1 are well suited for stand-alone game machines since the true depth attracts viewers due to new experiences.

Design

Previewing the look and feel of objects which have yet to be physically prototyped, and visualizing content for modeling and design in AR or VR without having to wear headsets. This is very important since developers cannot wear headset for many hours, but they can use the present invention with true optical depth.

Figure 14A:
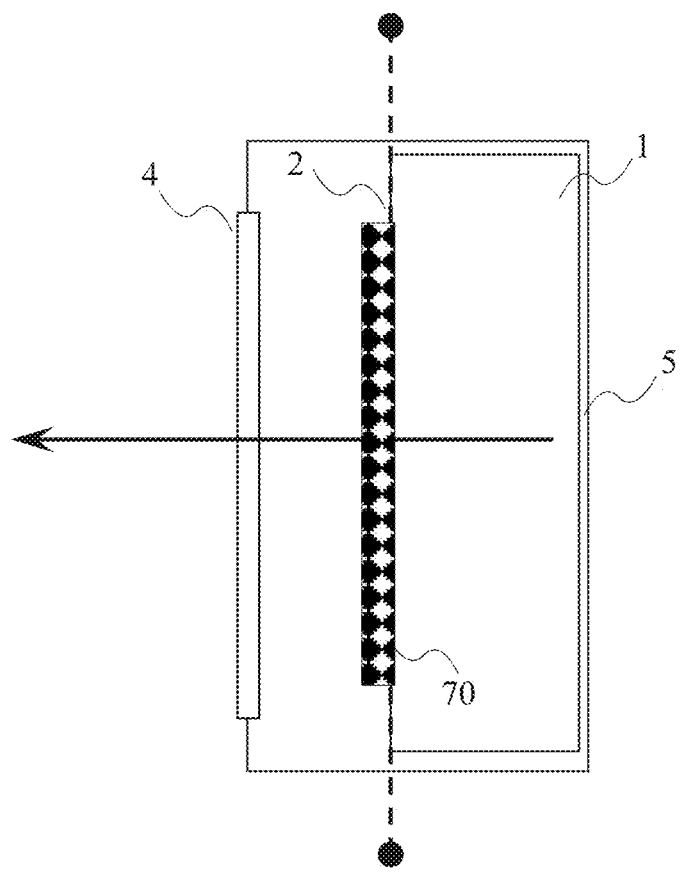
FIG. 14A illustrates an embodiment where an aperture optics is positioned at the cavity exit pupil of the field-evolving cavity.
Figure 14B:
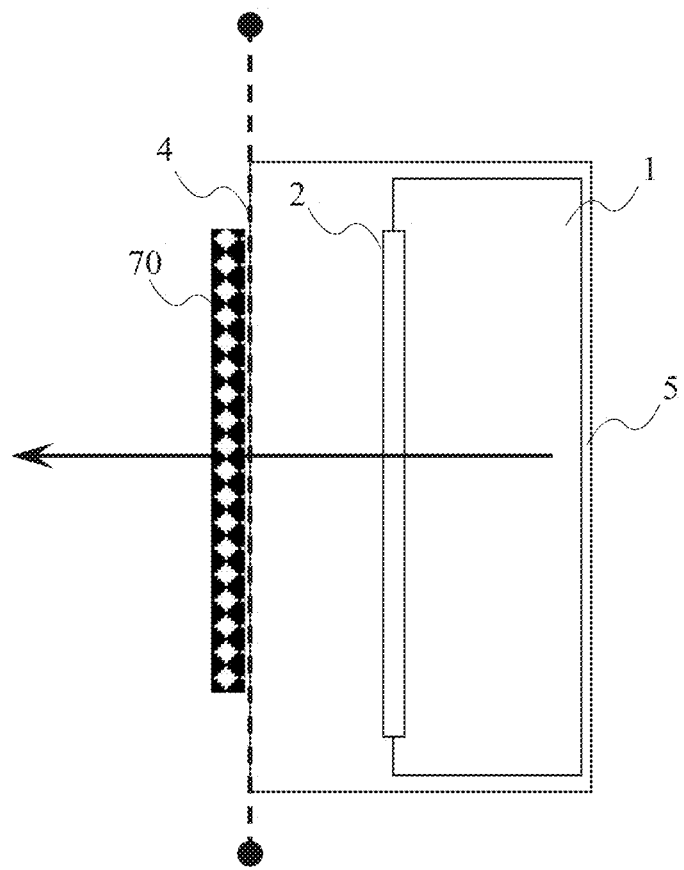
FIG. 14B illustrates an embodiment where an aperture optics is positioned at the enclosure exit pupil of the system enclosure.

In any of the embodiments of the field evolving cavities described above, aperture optics 70 can be added to assist and modify the optical properties of the light of the optical path. FIG. 14A and FIG. 14B show two exemplary examples.

In FIG. 14A, light that exits the field-evolving cavity 1 passes through the aperture optics 70 positioned at the cavity exit pupil 2. The light modified by the aperture optics 70 then exits the system enclosure 5 through the enclosure exit pupil 4. Similarly with the exemplary example in FIG. 14B, the field-evolving cavity 1 emits light through its cavity exit pupil 2. The light passes through and is modified by the aperture optics 70 positioned at the enclosure exit pupil 4 and travels to a viewer.

The aperture optics 70 can comprise any number of light modifying devices including, but not limited to, antireflection layers, prismatic films 17, privacy layers, absorptive polarizers, or micro-curtain layers. The aperture optics 70 may further be used to modify the ambient light that is directed toward the user from the external environment. As an exemplary example, an anti-reflection layer can be used as an aperture optic 70 to remove stray reflections that would otherwise enter the viewer's eyes. Aperture optics 70 may have the further function of protecting the components within the system enclosure 5 from the external environment. In some embodiments, aperture optics 70 can be placed at both the cavity exit pupil 2 and the enclosure exit pupil 4.

In this disclosure, the field-evolving cavity can produce a light-field display, or a subsampled light-field display, i.e., a light-field display that only approximately replicates the full light-field emanating from a physical three-dimensional scene. For example, fractional light-field display may produce a single virtual image, corresponding to a single focal plane or virtual depth.

In some embodiments, the field-evolving cavity 1 is further comprised of one or more semi-reflective elements 71 and one or more reflective element 72. In some embodiments of the present invention, these reflective elements 72 and semi-reflective elements 71 are configured such that the light of the optical path is at least partially folded onto itself to selectively tune a virtual depth location of a virtual image presented to a viewer. In other words, the field-evolving cavity 1, the reflective elements 72 and semi-reflective elements 71 are configured so a portion of the optical path is folded back onto the original optical path in order to adjust a depth of the focal plane along the optical path. This folding of the optical path upon itself allows the present invention to further tune the virtual depth location of the virtual image. Further embodiments, include switchable mirrors or mechanical actuators within the field-evolving cavity 1, configured to further tune the virtual depth location of the virtual image.

Figure 15:
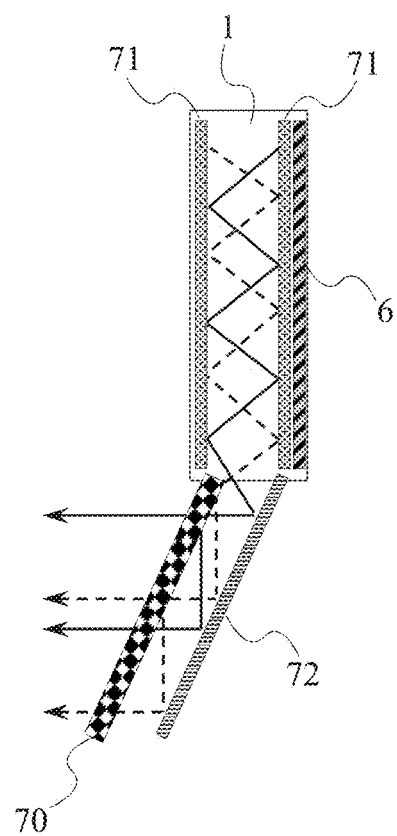
FIG. 15 illustrates an embodiment of the field-evolving cavity being configured as a light pipe in which elements of the present invention are segmented to produce multiple depths or images.

FIG. 15 shows a further embodiment of a field-evolving cavity 1 in which the semi-reflective elements 71 of the system are segmented to produce multiple depths through an extended aperture optics 70. In some embodiments, the display panel 6 itself can be segmented. In other embodiments, the reflective 72 or semi-reflective 71 optics may be segmented.

In this disclosure, an element that is "segmented" has a property that varies across the surface of the element. A segmented semi-reflective element, for example, is a semi-reflective element whose reflection coefficient or reflectivity various across its surface. The variation can be smooth, continuous, piecewise constant, or piecewise smooth. A segmented display panel is a display panel that shows different image content in various regions of the display panel. For example, a display panel that is segmented into two regions can show a first image and a second image. In this way, light emitted from, transmitted through, or reflected by different segments of segmented elements can travel different paths through the display system.

Figure 17:
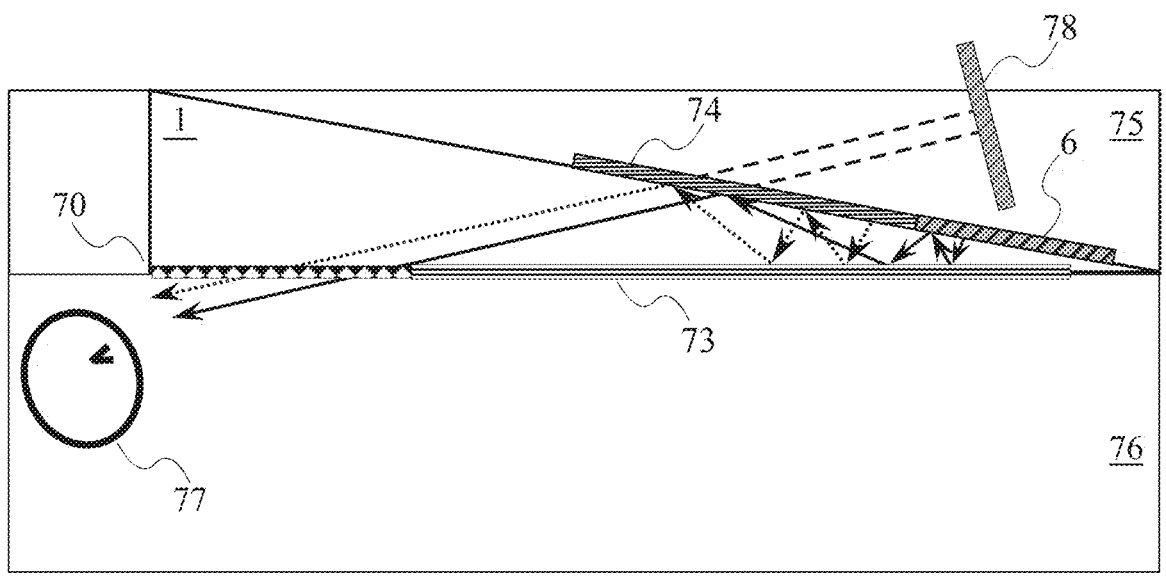
FIG. 17 illustrates an embodiment of the present invention where the field-evolving cavity is integrated into the roof of a vehicle.

This segmentation of components creates a number of segmented elements, such that a segmented display panel 6 may be segmented into a first segmented element and a second segmented element. There is no limit to the number of segmented elements created by a segmented component. Further, in the same manner the reflective 72 optics or the semi-reflective 71 optics can also be segmented into a first segmented element and a second segmented element. Any of the components within the present invention may be segmented in this same manner. Exemplary embodiments with segmented elements are shown in FIG. 15 and FIG. 17.

Further, the reflective 72 optics or the semi-reflective 71 optics may have gradient properties, such as a gradient reflectivity. The reflective 72 optics or the semi-reflective 71 optics, including segmented optics, can further be polarization-dependent, such that after interacting with the polarization-dependent element, the light of a first polarization travels a first optical path, and the light of a second polarization travels a second optical path.

As shown in FIG. 15, the light of the optical path may be guided along a cavity created between two or more reflectors, elements, optics, or components which constitute a light pipe. The light of the light pipe being guided down the cavity of the light pipe exiting the light pipe though aperture optics 70. The light being directed to the viewer.

In further embodiments a light pipe can be created with segmented elements, such as a first segmented element and a second segmented element. In one embodiment, the first segmented element and a second segmented element are comprised of polarization-dependent elements. The polarization-dependent elements of the first segmented element and a second segmented element be configured such that the light of a first polarization is guided along a light pipe along a first optical path and the light of a second polarization is guided along the light pipe along a second optical path. Thereby the light pipe produces a plurality of virtual images at a plurality of depths. In some embodiments, the light paths corresponding to the different segmented elements form images at the same depth but different lateral positions, such that together they form a single virtual image with extended aperture or field of view. In some embodiments, this polarization-dependent element light pipe is embedded or integrated into a vehicle.

Figure 16:
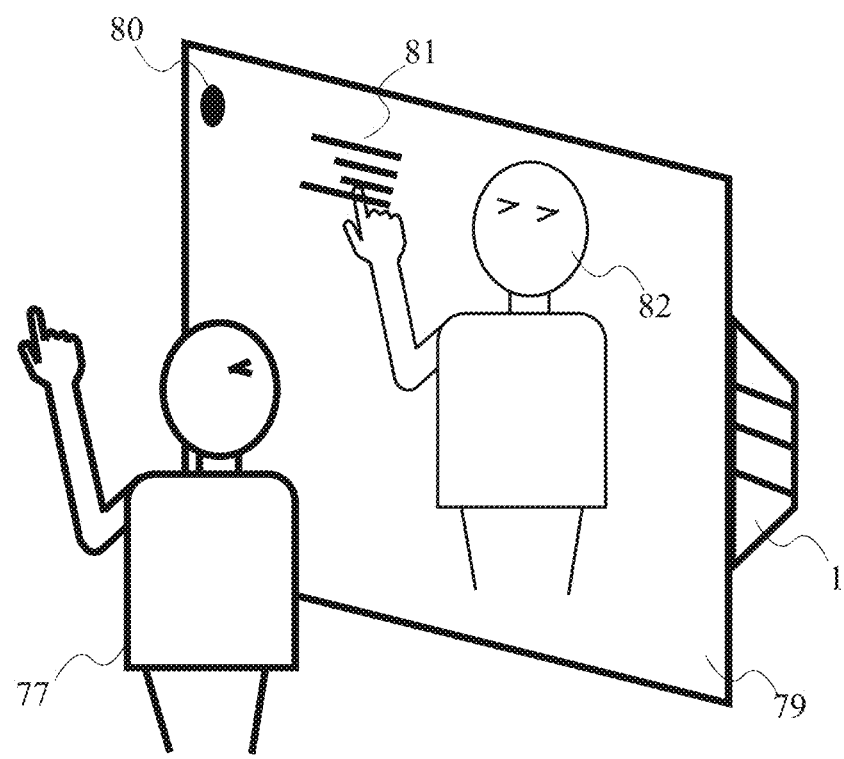
FIG. 16 illustrates an embodiment of the present invention where the field-evolving cavity is in optical communication with a mirror, the embodiment producing a virtual image at the same depth or a closer depth as the viewer's reflection.

The further embodiment shown in FIG. 16 has a field-evolving cavity 1 that has an exit aperture in optical communication with to a large mirror 79. The mirror can function partly as an aperture optic. The embodiment further comprises a gesture sensor 80, a depth camera 80, or both. The gesture sensor 80 or depth camera 80 being coupled or integrated into the display system. The gesture sensor 80 or depth camera 80 observes the viewer 77, such that the display system can capture, incorporate, or interpret the motions, positions, and gestures of the viewer 77. The gesture sensor 80 or depth camera 80 relays the information about the viewer 77 to the display system. The display system is then able to use this information to generate and display text or other augmentation effects dynamically as a virtual image 81. In some embodiments, the text or augmentation effects can be generated from other sources, and they can still be manipulated by the viewer through the depth camera 80 or gesture sensor 80.

In this embodiment, the field-evolving cavity 1 is configured to produce a virtual image 81, the virtual image 81 including any number of items such as but not limited text or images. This virtual image 81 is produced by the field-evolving cavity 1 so that the virtual image 81 appears at a virtual depth that is similar to the reflection 82 of the viewer in the mirror. In other words, when the viewer looks at their reflection 82 in the mirror, the virtual image 81 that is produced by the field-evolving cavity 1 appears to be at the same depth or appears to be on the same plane as the reflection 82 in the mirror.

In some embodiments, the field-evolving cavity 1 can further comprise a retroreflective or a retrorefractive element. The retroreflective or retrorefractive element can be configured so that the virtual image 81 appears closer to the viewer 77 compared to the viewer's 77 physical distance to the display. Thereby, the text or augmentation effects of the virtual image 81 appear at the same depth as the viewer's image. The viewer can then interact with the virtual images 81 via the gesture sensor 80 or depth camera as if the text or augmentation effects of the virtual image 81 are hovering in mid-air.

FIG. 17 shows a further embodiment where the field-evolving cavity 1 is embedded or integrated into the roof 75 or ceiling of a vehicle 76. In this further embodiment, which is similar to embodiment 33 of FIG. 9, the display panel 6 emits light into the field-evolving cavity 1, which can have a first element 73 and a second element 74. Both the first element 73 and the second element 74 can be reflective elements or semi-reflective elements which are positioned at angles of less than 45 degrees relative to each other. This angle can be designed arbitrarily. In some embodiments, the display panel itself can be segmented; in some embodiments, the first element or the second element can be segmented. In some embodiments, the segmented properties can be switchable in time, such that light travels a first path at a first time, and subsequent light travels a different path at a second time. In some embodiments, no elements are segmented. As the light is reflected between the two reflective elements, the angle at which it travels becomes shallower. This creates a light pipe that directs the light out of the exit of the display system towards a viewer 77, who sees a virtual image 78 corresponding to a shallower line of sight. In some embodiments, the virtual image is tilted at an angle different from that of any of the components of the display system and from that of the roof or ceiling. The viewer does not see a virtual image when looking straight up into the roof of the vehicle. In some embodiments, an aperture optic 70 is used. In some embodiments a relay mechanism 3 is used. In some embodiments, a component of the display system, such as the second segmented element, functions simultaneously as an aperture optic, relay mechanism, and optical tuning mechanism, or a subset thereof.

In some embodiments, the light path can be impacted by polarization-dependent elements. For example, a semi-reflective element can comprise a polarization-dependent grating, which directs light of a first polarization along a first path and light of a second polarization along a second path. The polarization of the light can be changed using quarter-wave plates and reflective polarizers.

In some embodiments, the field-evolving cavity can further comprise retroreflecting or retrorefracting elements, such that the virtual images appear closer to a viewer rather than farther away. Similar to the embodiment in FIG. 16, gesture cameras or depth sensors can be coupled to the display system, such that a viewer can interact with the virtual images. In some embodiments, the display system is transparent or semi-transparent for a see-through effect, such that a user can see simultaneously the display content and the environment behind the display system. In some embodiments, cameras capture information about the environment outside the vehicle, and the display system displays that information, for a video see-through effect.

The embodiment in FIG. 17 is an example of a wedge-type cavity, described in FIG. 9, but it can also be configured as other classes or orders of field-evolving cavities, such that the light path folds onto itself exactly or approximately. In such cavities, light can be folded when it experiences multiple reflections from a single element.

Although the invention has been explained in relation to its preferred embodiment, it is to be understood that many other possible modifications and variations can be made without departing from the spirit and scope of the invention as hereinafter claimed.

What is claimed is:

1. A display system comprising:
    at least one display panel;
    a field-evolving cavity;
    a system enclosure;
    the field-evolving cavity further comprising at least one semi-reflective element and at least one reflective element;
    the field-evolving cavity being in optical communication with the at least one display panel;
    the field-evolving cavity and the at least one display panel being mounted within the system enclosure;
    the field-evolving cavity being configured to generate at least one virtual image with at least one focal plane along an optical path directed towards a viewer; and
    the field-evolving cavity being configured so a portion of the optical path is folded back onto the optical path to adjust a depth of the at least one focal plane along the optical path.

2. The display system as claimed in claim 1, wherein the field-evolving cavity further comprises a switchable mirror.

3. The display system as claimed in claim 1, wherein the field-evolving cavity further comprises an aperture optics and a cavity exit pupil;
    the aperture optics being positioned at the cavity exit pupil of the field-evolving cavity; and
    the aperture optics modifying a property of a light ray that is directed toward the viewer.

4. The display system as claimed in claim 1, wherein the system enclosure further comprises an aperture optics and an enclosure exit pupil;
    the aperture optics being positioned at the enclosure exit pupil of the system enclosure; and
    the aperture optics modifying a property of a light ray that is directed toward the viewer.

5. The display system as claimed in claim 1, wherein the field-evolving cavity further comprises a mechanical actuator; and
    the mechanical actuator configured to adjust the depth of the at least one focal plane along the optical path.

6. The display system as claimed in claim 1, wherein the at least one semi-reflective element is polarization-dependent such that a light of a first polarization travels a first optical path, and a light of a second polarization travels a second optical path.

7. The display system as claimed in claim 1, wherein the field-evolving cavity further comprises at least one piece of higher refractive index material; and
    the at least one piece of higher refractive index material configured to adjust the depth of the at least one focal plane along the optical path.

8. The display system as claimed in claim 1, wherein the field-evolving cavity further comprises at least one prismatic film; and
    the at least one prismatic film configured to enhance a brightness of the optical path.

9. The display system as claimed in claim 1, wherein the at least one display panel is segmented.

10. The display system as claimed in claim 1, wherein the at least one reflective element or the at least one semi-reflective element is segmented.

11. The display system as claimed in claim 1 further comprising:
    a relay mechanism;
    the relay mechanism being mounted within the system enclosure;
    the relay mechanism being positioned along the optical path after the field-evolving cavity; and
    the relay mechanism configured to direct the optical path exiting the field-evolving cavity towards the viewer.

12. The display system as claimed in claim 11, wherein the relay mechanism is selected from a group consisting of: an angled reflector relay, a curved angled reflector relay, a waveguide, and a compressed relay system.

13. The display system as claimed in claim 1, wherein a first element of the field-evolving cavity is positioned at an angle less than 45 degrees relative to a second element of the field-evolving cavity.

14. The display system as claimed in claim 13, wherein the system enclosure is integrated into a roof of a vehicle.

15. The display system as claimed in claim 14, wherein the field-evolving cavity is configured as a light pipe such that the optical path is directed toward a viewer in a vehicle.

16. The display system as claimed in claim 14, wherein an orientation of the virtual image is different from an orientation of a component of the display system.

17. A display system comprising:
    at least one display panel;
    a field-evolving cavity;
    a system enclosure;
    the field-evolving cavity being in optical communication with the at least one display panel;
    the field-evolving cavity and the at least one display panel being mounted within the system enclosure;
    the field-evolving cavity being configured to generate at least one virtual image with at least one focal plane along an optical path directed towards a viewer;
    the field-evolving cavity further comprising a plurality of polarization-dependent elements;
    the plurality of polarization-dependent elements configured such that a light of a first polarization travels a first optical path, and a light of a second polarization travels a second optical path; and
    the plurality of polarization-dependent elements configured to adjust a depth of the at least one focal plane along the optical path.

18. The display system as claimed in claim 17, wherein the system enclosure further comprises a relay mechanism.

19. The display system as claimed in claim 17, wherein the field-evolving cavity further comprises an aperture optics; and
    the aperture optics modifying a property of a light ray that is directed toward the viewer.

20. The display system as claimed in claim 17, wherein the system enclosure further comprises an aperture optics; and
    the aperture optics modifying a property of a light ray that is directed toward the viewer.

21. The display system as claimed in claim 17, wherein the plurality of polarization-dependent elements further comprises a waveplate and a polarizer.

22. The display system as claimed in claim 17 further comprising:
a first element;
a second element;
the system enclosure being integrated into a roof of a vehicle;
the field-evolving cavity being configured as a light pipe such that the optical path is directed toward a viewer in a vehicle; and
the plurality of polarization-dependent elements being configured such that a light of a first polarization travels a first optical path, and a light of a second polarization travels a second optical path.

23. A display system comprising:
at least one display panel;
a field-evolving cavity;
a system enclosure;
the field-evolving cavity being in optical communication with the at least one display panel;
the field-evolving cavity and the at least one display panel being mounted within the system enclosure;
the field-evolving cavity being configured to generate at least one virtual image with at least one focal plane along an optical path directed towards a viewer;
the system enclosure further comprising an exit aperture;
the exit aperture of the system enclosure being in optical communication with a mirror; and
the field-evolving cavity configured such that a virtual image produced by the field-evolving cavity appears at a virtual depth similar to a depth of a reflection of the viewer in the mirror.

24. The display system as claimed in claim 23 further comprising:
a retroreflective element; and
the retroreflective element configured such that the virtual image produced by the field-evolving cavity appears at a virtual depth closer than the depth of the reflection of the viewer in the mirror.

25. The display system as claimed in claim 23 further comprising:
a gesture sensor; and
the gesture sensor configured to observe a gesture of the viewer.

26. The display system as claimed in claim 23 further comprising:
a depth sensor; and
the depth sensor configured to observe a position of the viewer.

27. The display system as claimed in claim 23, wherein the at least one display panel is segmented.

* * * * *